US012682184B2

(12) United States Patent
Shoham et al.

(10) Patent No.: US 12,682,184 B2
(45) Date of Patent: Jul. 14, 2026

(54) MODULAR REASONING, KNOWLEDGE, AND LANGUAGE SYSTEMS

(71) Applicant: AI21 Labs, Tel Aviv (IL)

(72) Inventors: Yoav Shoham, Tel Aviv (IL); Barak Lenz, Tel Aviv (IL); Opher Lieber, Sde Warburg (IL); Yoav Levine, Tel Aviv (IL); Amnon Shashua, Tel Aviv (IL); Shai Shalev-Shwartz, Tel Aviv (IL); Kevin Leyton-Brown, Vancouver (CA); Ehud Karpas, Rehovot (IL); Erez Schwartz, Tel Aviv (IL); Noam Rozen, Tel Aviv (IL); Hofit Bata, Tel Aviv (IL); Gal Shachaf, Tel Aviv (IL); Dor Muhlgay, Tel Aviv (IL); Yoel Zeldes, Jerusalem (IL); Ori Ram, Tel Aviv (IL); Itay Dalmedigos, Tel Aviv (IL); Daniel Jannai-Epstein, Jerusalem (IL); Nir Ratner, Tel Aviv (IL)

(73) Assignee: AI21 LABS, Tel Aviv (IL)

( * ) Notice: Subject to any disclaimer, the term of this patent is extended or adjusted under 35 U.S.C. 154(b) by 0 days.

(21) Appl. No.: 18/828,735

(22) Filed: Sep. 9, 2024

(65) Prior Publication Data

US 2024/0428017 A1 Dec. 26, 2024

Related U.S. Application Data

(63) Continuation of application No. PCT/US2023/018128, filed on Apr. 11, 2023.
(Continued)

(51) Int. Cl.
| | |
|---|---|
| *G06F 17/27* | (2006.01) |
| *G06F 40/103* | (2020.01) |
| *G06F 40/40* | (2020.01) |

(52) U.S. Cl.
CPC ............ *G06F 40/40* (2020.01); *G06F 40/103* (2020.01)

(58) Field of Classification Search
CPC ........ G06F 40/00; G06F 40/40; G06F 40/103; G06F 40/20; G06F 40/279;
(Continued)

(56) References Cited

U.S. PATENT DOCUMENTS

| | | | |
|---|---|---|---|
| 8,484,015 B1 | 7/2013 | Wolfram et al. | |
| 9,411,803 B2 * | 8/2016 | Assulin | G06F 16/243 |

(Continued)

FOREIGN PATENT DOCUMENTS

WO WO-2018208514 A1 * 11/2018 ......... G06F 16/3322

OTHER PUBLICATIONS

International Search Report issued in International Application No. PCT/US2023/018128 dated Jun. 29, 2023 (8 pages).
(Continued)

*Primary Examiner* — Michael Ortiz-Sanchez
(74) *Attorney, Agent, or Firm* — FINNEGAN, HENDERSON, FARABOW, GARRETT & DUNNER, LLP

(57) ABSTRACT

The presently disclosed embodiments may include a computer readable medium including instructions that when executed by one or more processing devices cause the one or more processing devices to perform a method. The method may include receiving a user input, wherein the user input includes a natural language question, using a trained language model to decompose the natural language question into two or more information requests, routing each of the two or more information requests to at least one information resource, receiving two or more information responses from the at least one information resource, wherein the two or more information responses correspond to the two or more
(Continued)

information requests, generating a natural language response to the user input based on the two or more information responses and providing the natural language response to the user.

20 Claims, 23 Drawing Sheets

Related U.S. Application Data

(60) Provisional application No. 63/330,015, filed on Apr. 12, 2022.

(58) Field of Classification Search
CPC .. G06F 16/3329; G06F 40/30; G06F 16/3344; G06F 40/284; G06F 3/167; G06F 16/90332; G06F 16/243; G06F 16/248; G06F 16/338; G06F 9/453; G06F 3/16; G06F 16/3338; G06F 16/9538; G06F 16/90335; G06F 16/245; G06F 16/9532; G06F 16/33; G06F 16/9038; G06F 16/3331; G06F 16/00; G06F 16/532; G06F 16/2453; G06F 16/2452; G06F 16/432; G06F 16/953; G06F 16/24; G06F 16/9032; G06F 16/63; G06F 16/683; G06F 16/632; G06F 16/95; G06F 16/53; G06F 16/638; G06F 16/73; G06F 16/903; G06F 16/24522; G06F 40/10; G06F 16/332; G06F 16/34; G06F 16/24539; G06F 16/9035; G06F 16/908; G06F 16/2445; G06F 16/2425; G10L 2015/223; G10L 15/26; G10L 15/1822; G10L 17/22; G06N 20/00; G06N 3/08; G06N 5/022; G06N 5/04; G06N 5/02; G06N 3/042; G06N 3/09; G06N 3/096
See application file for complete search history.

(56)                   References Cited

U.S. PATENT DOCUMENTS

| | | | |
|---|---|---|---|
| 10,747,758 B2 * | 8/2020 | Gupta | G06F 16/243 |
| 2012/0005148 A1 * | 1/2012 | Horvitz | G06N 20/00 |
| | | | 706/50 |
| 2014/0258286 A1 | 9/2014 | Brown et al. | |
| 2017/0031896 A1 | 2/2017 | Dymetman et al. | |
| 2017/0308571 A1 * | 10/2017 | McCurley | G06F 16/243 |
| 2020/0242145 A1 | 7/2020 | Wieweg et al. | |
| 2022/0036424 A1 * | 2/2022 | Almeida | G06Q 30/0627 |

OTHER PUBLICATIONS

Ferrucci David et al: "Building Watson: An Overview of the DeepQA Project", AI Magazine., vol. 31, No. 3, Sep. 1, 2010, pp. 59-79, XP093193097, CA ISSN:0738-4602, DOI: 10.1609/aimag. c31i3.2303 (21 pages).
Extended European Search Report of the European Patent Office for counterpart European Application No. 23788835.9 dated Jan. 27, 2026 (8 pages).

\* cited by examiner

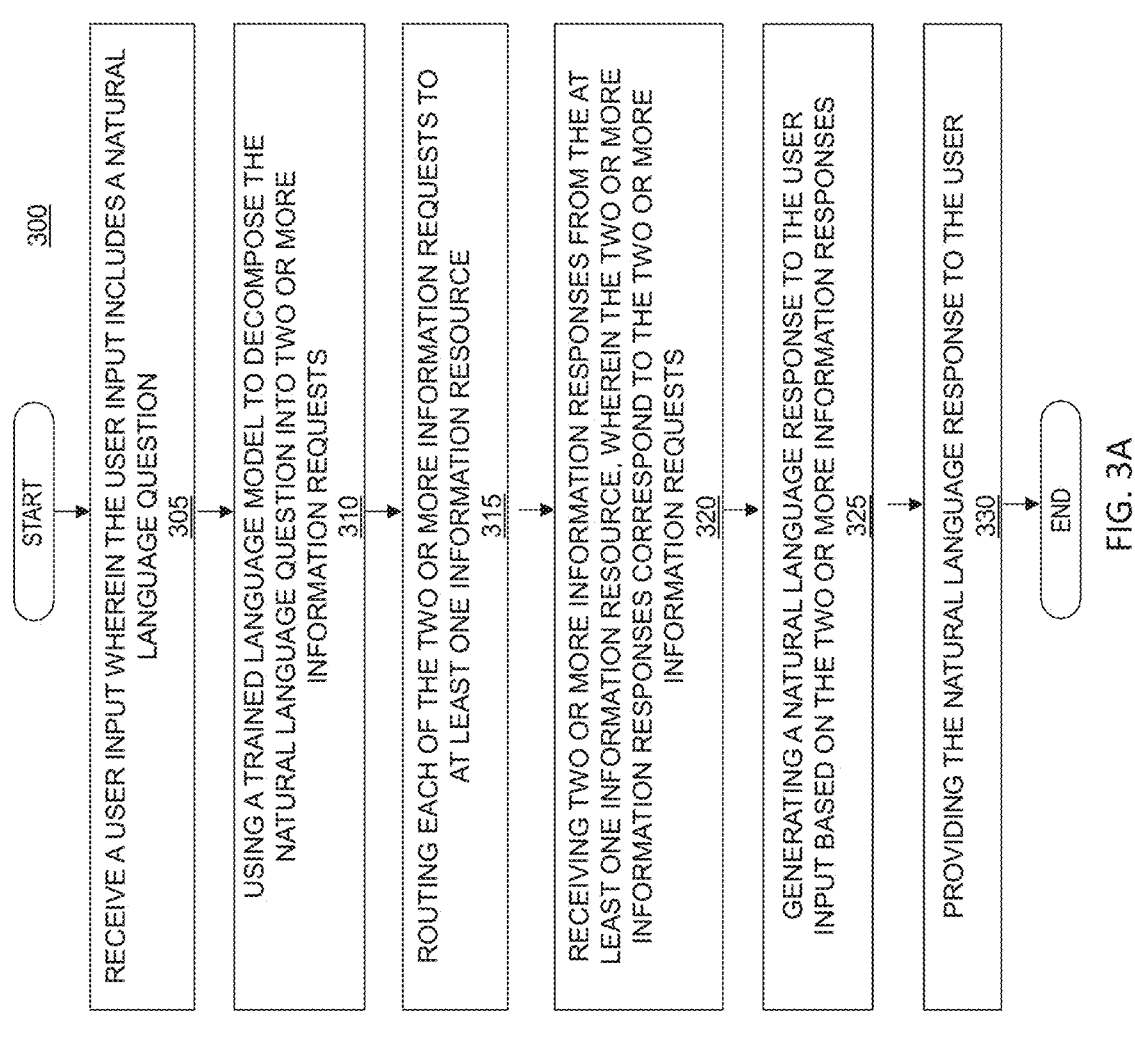

300

START

RECEIVE A USER INPUT WHEREIN THE USER INPUT INCLUDES A NATURAL LANGUAGE QUESTION
305

USING A TRAINED LANGUAGE MODEL TO DECOMPOSE THE NATURAL LANGUAGE QUESTION INTO TWO OR MORE INFORMATION REQUESTS
310

ROUTING EACH OF THE TWO OR MORE INFORMATION REQUESTS TO AT LEAST ONE INFORMATION RESOURCE
315

RECEIVING TWO OR MORE INFORMATION RESPONSES FROM THE AT LEAST ONE INFORMATION RESOURCE, WHEREIN THE TWO OR MORE INFORMATION RESPONSES CORRESPOND TO THE TWO OR MORE INFORMATION REQUESTS
320

GENERATING A NATURAL LANGUAGE RESPONSE TO THE USER INPUT BASED ON THE TWO OR MORE INFORMATION RESPONSES
325

PROVIDING THE NATURAL LANGUAGE RESPONSE TO THE USER
330

END

FIG. 3A

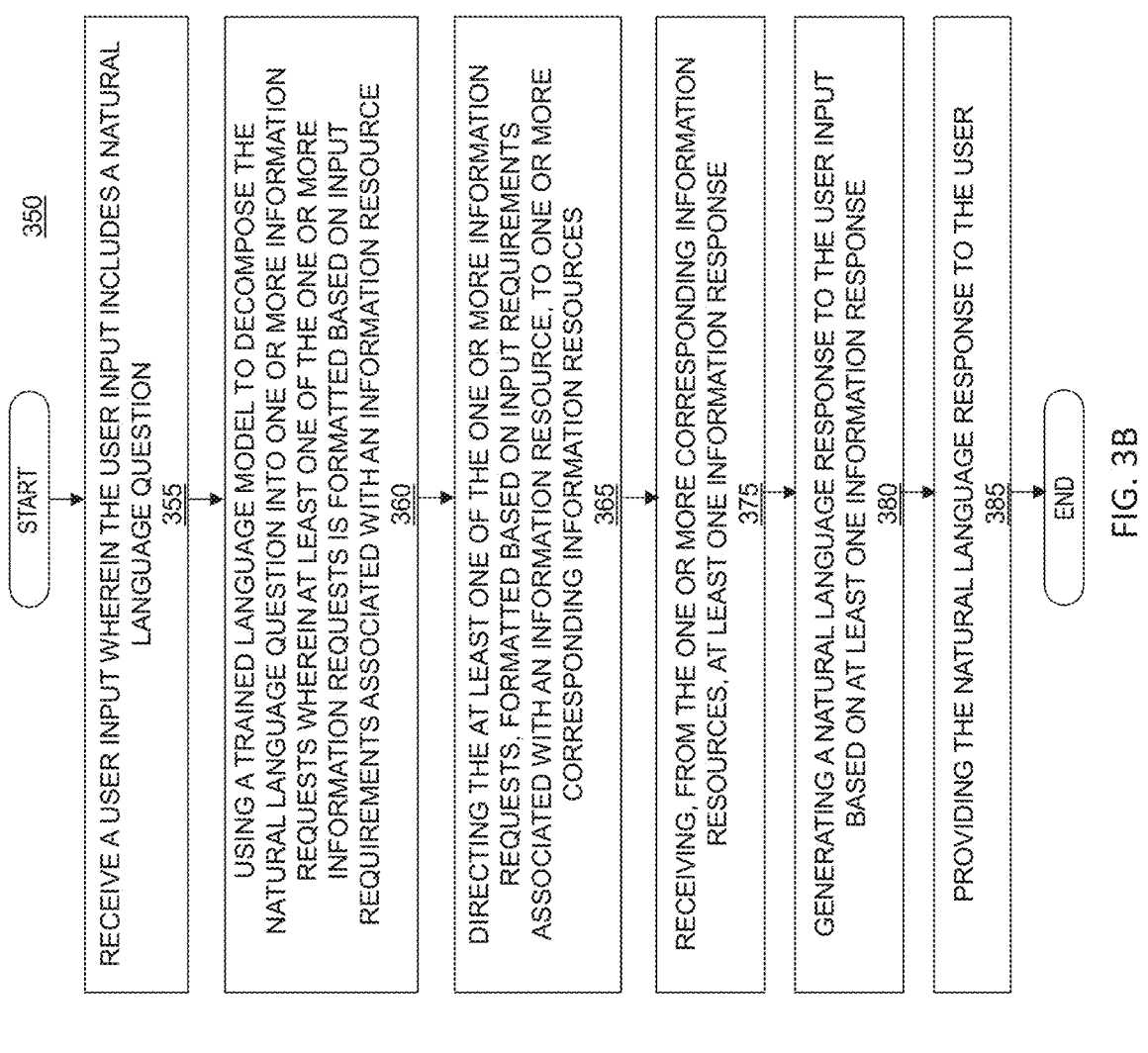

350

START

RECEIVE A USER INPUT WHEREIN THE USER INPUT INCLUDES A NATURAL LANGUAGE QUESTION
355

USING A TRAINED LANGUAGE MODEL TO DECOMPOSE THE NATURAL LANGUAGE QUESTION INTO ONE OR MORE INFORMATION REQUESTS WHEREIN AT LEAST ONE OF THE ONE OR MORE INFORMATION REQUESTS IS FORMATTED BASED ON INPUT REQUIREMENTS ASSOCIATED WITH AN INFORMATION RESOURCE
360

DIRECTING THE AT LEAST ONE OF THE ONE OR MORE INFORMATION REQUESTS, FORMATTED BASED ON INPUT REQUIREMENTS ASSOCIATED WITH AN INFORMATION RESOURCE, TO ONE OR MORE CORRESPONDING INFORMATION RESOURCES
365

RECEIVING, FROM THE ONE OR MORE CORRESPONDING INFORMATION RESOURCES, AT LEAST ONE INFORMATION RESPONSE
375

GENERATING A NATURAL LANGUAGE RESPONSE TO THE USER INPUT BASED ON AT LEAST ONE INFORMATION RESPONSE
380

PROVIDING THE NATURAL LANGUAGE RESPONSE TO THE USER
385

END

FIG. 3B

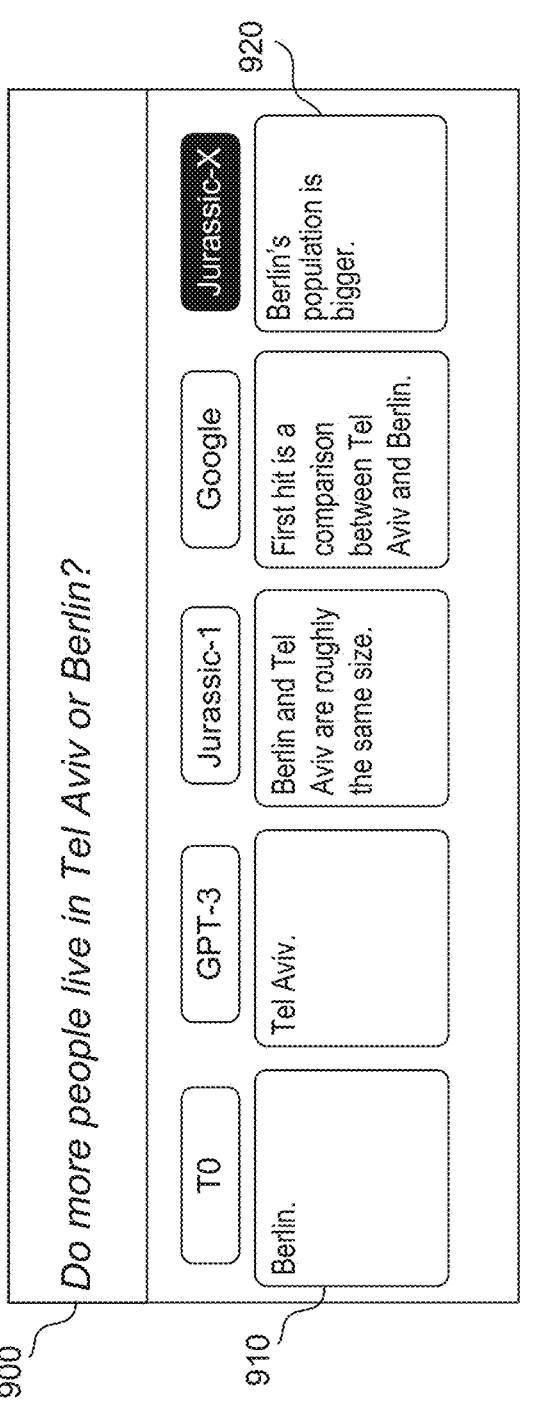

*Do more people live in Tel Aviv or Berlin?*

T0 — Berlin.

GPT-3 — Tel Aviv.

Jurassic-1 — Berlin and Tel Aviv are roughly the same size.

Google — First hit is a comparison between Tel Aviv and Berlin.

Jurassic-X — Berlin's population is bigger.

['Return population of Tel Aviv'; 'Return population of Berlin'; Return which is bigger between #1 and #2']

Step 1: Population of Tel Aviv. Result – 451523.

Step 2: Population of Berlin. Result – 3664088.

Step 3: Which is bigger, #1 or #2. Result – Berlin.

FIG. 9

| Was Clinton ever elected as president of the United States? | | | |
|---|---|---|---|
| GPT 3 | J1 | Google | Jurassic-X |
| No, Clinton was never elected as president of the United States. | No | Clinton was elected president in the 1992 presidential elections. | Bill Clinton was elected president. |

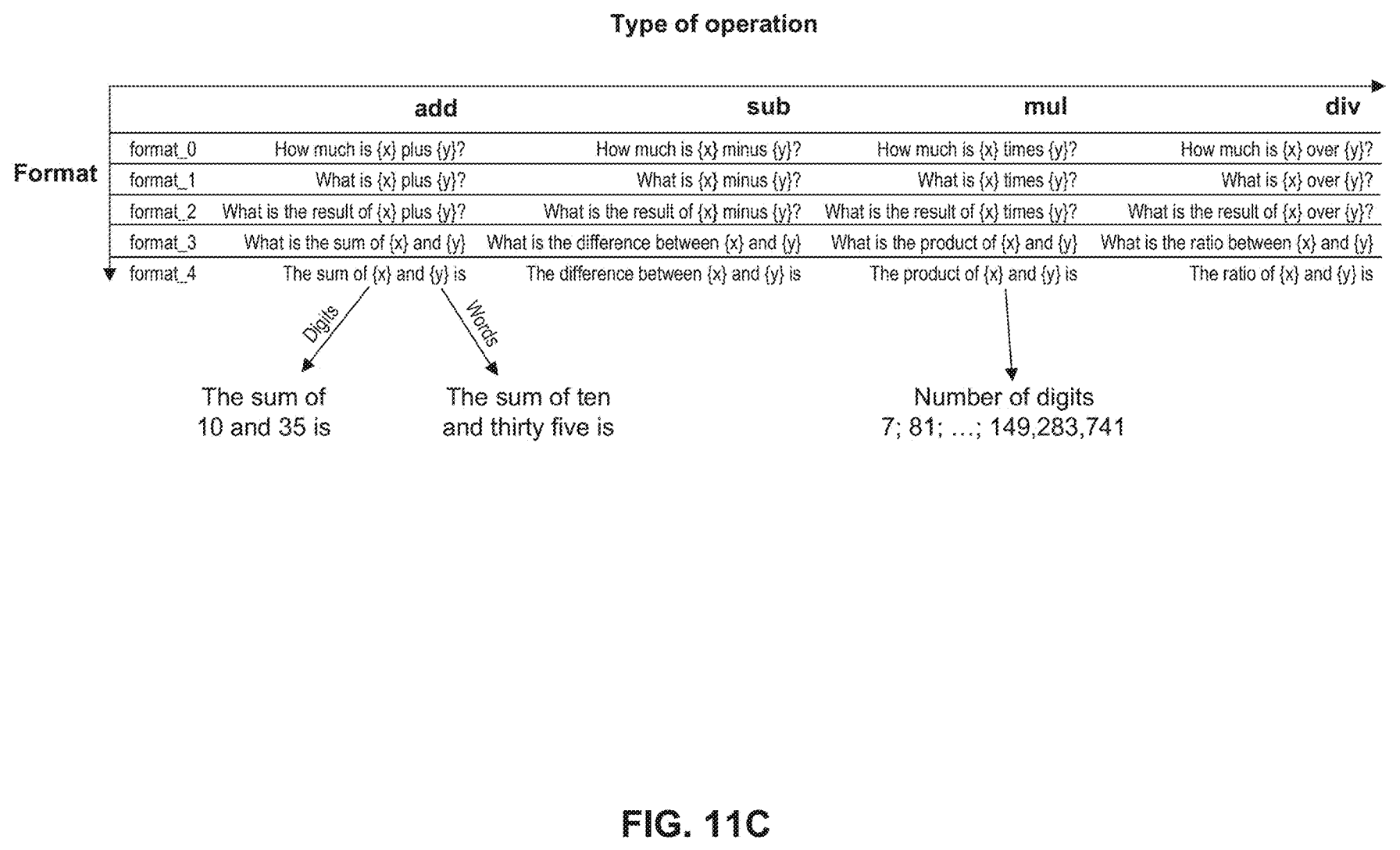

Type of operation

| Format | add | sub | mul | div |
|---|---|---|---|---|
| format_0 | How much is {x} plus {y}? | How much is {x} minus {y}? | How much is {x} times {y}? | How much is {x} over {y}? |
| format_1 | What is {x} plus {y}? | What is {x} minus {y}? | What is {x} times {y}? | What is {x} over {y}? |
| format_2 | What is the result of {x} plus {y}? | What is the result of {x} minus {y}? | What is the result of {x} times {y}? | What is the result of {x} over {y}? |
| format_3 | What is the sum of {x} and {y} | What is the difference between {x} and {y} | What is the product of {x} and {y} | What is the ratio between {x} and {y} |
| format_4 | The sum of {x} and {y} is | The difference between {x} and {y} is | The product of {x} and {y} is | The ratio of {x} and {y} is |

Digits → The sum of 10 and 35 is

Words → The sum of ten and thirty five is

Number of digits
7; 81; ...; 149,283,741

FIG. 11C

| OP1/<br>OP2 | + | - | * | / |
|---|---|---|---|---|
| + | A + B + C | A + B - C | (A + B) * C<br>A + (B * C) | (A + B) / C<br>A + (B / C) |
| - | (A − B) + C<br>A − (B + C) | (A − B) - C<br>A − (B - C) | (A - B) * C<br>A - (B * C) | (A - B) / C<br>A - (B / C) |
| * | A * (B + C)<br>(A * B) + C | (A * B) - C<br>A * (B - C) | A * B * C | (A * B) / C<br>A * (B / C) |
| / | A / (B + C)<br>(A / B) + C | (A / B) - C<br>A / (B - C) | (A / B) * C<br>A / (B * C) | (A / B) / C<br>A / (B / C) |

FIG. 11D

| Operation | | Number of digits in test data | | | | | | | | |
|---|---|---|---|---|---|---|---|---|---|---|
| Train | Test | 1 | 2 | 3 | 4 | 5 | 6 | 7 | 8 | 9 |
| + | + | 1.0 | 1.0 | 1.0 | 1.0 | 1.0 | 1.0 | 1.0 | 1.0 | 1.0 |
| * | * | 1.0 | 1.0 | 1.0 | 1.0 | 1.0 | 0.98 | 1.0 | 1.0 | 1.0 |
| + | * | 0 | 0 | 0.16 | 0.38 | 0.08 | 0.12 | 0.06 | 0.04 | 0 |
| * | + | 0.9 | 0.8 | 0.76 | 0.94 | 0.94 | 0.98 | 1.0 | 0.92 | 0.96 |

FIG. 11E

| Input | Operation | | Number of digits in test data | | | | | | | | |
|---|---|---|---|---|---|---|---|---|---|---|---|
| | Train | Test | 1 | 2 | 3 | 4 | 5 | 6 | 7 | 8 | 9 |
| Digits | + | + | 1.0 | 0.36 | 0 | 0.04 | 0 | 0 | 0 | 0 | 0 |
| | * | * | 0.9 | 0.58 | 0.08 | 0.02 | 0.04 | 0 | 0 | 0 | 0 |
| Words | + | + | 1.0 | 1.0 | 1.0 | 0.98 | 1.0 | 0.94 | 0.98 | 0.98 | 0.96 |
| | * | * | 1.0 | 1.0 | 0.98 | 0.92 | 1.0 | 1.0 | 0.98 | 1.0 | 1.0 |
| Digits | + | * | 0.86 | 0.24 | 0.02 | 0 | 0 | 0 | 0 | 0 | 0 |
| | * | + | 0.86 | 0.32 | 0.02 | 0.04 | 0.02 | 0.02 | 0 | 0 | 0 |
| Words | + | * | 0 | 0 | 0 | 0.02 | 0 | 0 | 0 | 0 | 0 |
| | * | + | 0 | 0 | 0 | 0 | 0 | 0 | 0 | 0 | 0 |

FIG. 11F

| LM Passes | LM size | Model | Connector Layers | Pretrain int | EM |
|---|---|---|---|---|---|
| 1 | 7B | Prompt-tuned | - | No | 17.1 |
| 1 | 7B | Prompt-tuned | - | Yes | 17.0 |
| 1 | 7B | LM-Connector | 2 | Yes | 17.3 |
| 1 | 7B | Connector-LM | 2 | Yes | 18.6 |
| 2 | 7B | LM-Connector-LM | 2 | No | 18.7 |
| 2 | 7B | LM-Connector-LM | 1 | Yes | 19.6 |
| 2 | 7B | LM-Connector-LM | 2 | Yes | 20.8 |
| 1 | 17B | Prompt-tuned | - | No | 22.1 |

FIG. 12D

| LM Passes | LM size | Method | EM dev/test |
|---|---|---|---|
| 1 | 7B | Prompt-tuned | 20.5?/21.6 |
| 2 | 7B | Textual-recursive | 22.8?/23.6 |
| 2 | 7B | Neural-recursive | 25?/26.0 |

FIG. 12E

MODULAR REASONING, KNOWLEDGE, AND LANGUAGE SYSTEMS

RELATED APPLICATIONS

This application is a continuation of International Application No. PCT/US2023/018128, filed on Apr. 11, 2023, which claims priority to U.S. Provisional Patent Application No. 63/330,015, filed on Apr. 12, 2022. The disclosures of the above-referenced applications are expressly incorporated herein by reference in their entireties.

BACKGROUND

The disclosed technology relates generally to natural language processing from an automated computer-based system. Prior systems can perform natural language-based knowledge tasks in response to natural language text input, for example, by generating a natural language response based on words (i.e., a user query) entered into a graphical user interface. Typically, these systems rely on a trained language models that allow the natural language processor to respond to the provided user input. For example, a natural language system based on a language model may receive text as input and produce a likely response based on its training. The accuracy of the response will depend on the data to which the model was exposed during training. If the information or answer sought depends on information outside of the model's training data set (e.g., information that was generated after training of the model occurred), the model will return an answer, but the accuracy of that answer may be low. For example, a queries to a typical trained language model for information relating to a current stock price, current affairs/news, dynamically changing information (such as a weather forecast, etc.) tend to be inaccurate, as the trained models do not have experience with information newly generated after their training and are not equipped with tools to ascertain the requested information.

In addition to information-related limitations, prior trained language models systems tend to perform poorly relative to task that require reasoning. For example, natural language inputs that require even minimally complex mathematical operations or performance of multiple logical sub-parts to answer simple questions lead to disappointing results using currently available trained language models.

To address such issues, trained models can be fine-tuned to perform specific tasks or categories of tasks. Such fine-tuning, however, can result in unintended side effects. For example, while performance of the model may be improved in certain areas, its broader performance in other areas may be degraded. Training of language models may also be updated periodically. Such an approach, however, would still result in information gaps and would not provide a capability for working with unique sets of information (e.g., information contained in proprietary databases, etc.). More importantly, in view of the significant time and expense (e.g., millions of dollars in investment) to train large language models, such an approach focused on increased training frequency would not be feasible.

There is a significant need for natural language systems capable of responding to user input that implicates information generated after model training, requires mathematical operations or segmentation into logical sub-parts, and/or relates to information stored in databases, among other examples. The disclosed embodiments are aimed at addressing these and other deficiencies of current language models.

SUMMARY

The presently disclosed embodiments may include a computer readable medium including instructions that when executed by one or more processing devices cause the one or more processing devices to perform a method. The method may include receiving a user input, wherein the user input includes a natural language question, using a trained language model to decompose the natural language question into two or more information requests, and routing each of the two or more information requests to at least one information resource. The method may further include receiving two or more information responses from the at least one information resource, wherein the two or more information responses correspond to the two or more information requests, generating a natural language response to the user input based on the two or more information responses, and providing the natural language response to the user.

The presently disclosed embodiments may also include a computer readable medium including instructions that when executed by one or more processing devices cause the one or more processing devices to perform a method including: receiving a user input in a natural language system, wherein the user input includes a natural language question, using a trained language model to decompose the natural language question into one or more information requests, wherein at least one of the one or more information requests is formatted based on input requirements associated with an information resource, and directing the at least one of the one or more information requests, formatted based on input requirements associated with an information resource, to one or more corresponding information resources. The method may further include receiving, from the one or more corresponding information resources, at least one information response, generating a natural language response to the user input based on the at least one information response, and providing the natural language response to the user.

BRIEF DESCRIPTION OF DRAWING(S)

FIGS. 3A and 3B are flowcharts showing an exemplary process for implementing a natural language system augmented with external information resources.

FIG. 9 shows answers from different natural language systems to a user input that requires multiple steps and an analysis of the results to respond.

FIG. 10 shows answers from different natural language systems to a user input that requires multiple steps and an analysis of the results from the steps to respond.

FIG. 11A through 11F show diagrams consistent with embodiments of the MRKL system.

FIG. 12A through 12E shows block diagrams consistent with embodiments including multi-task operation of a natural language system.

DETAILED DESCRIPTION

Figure 1:
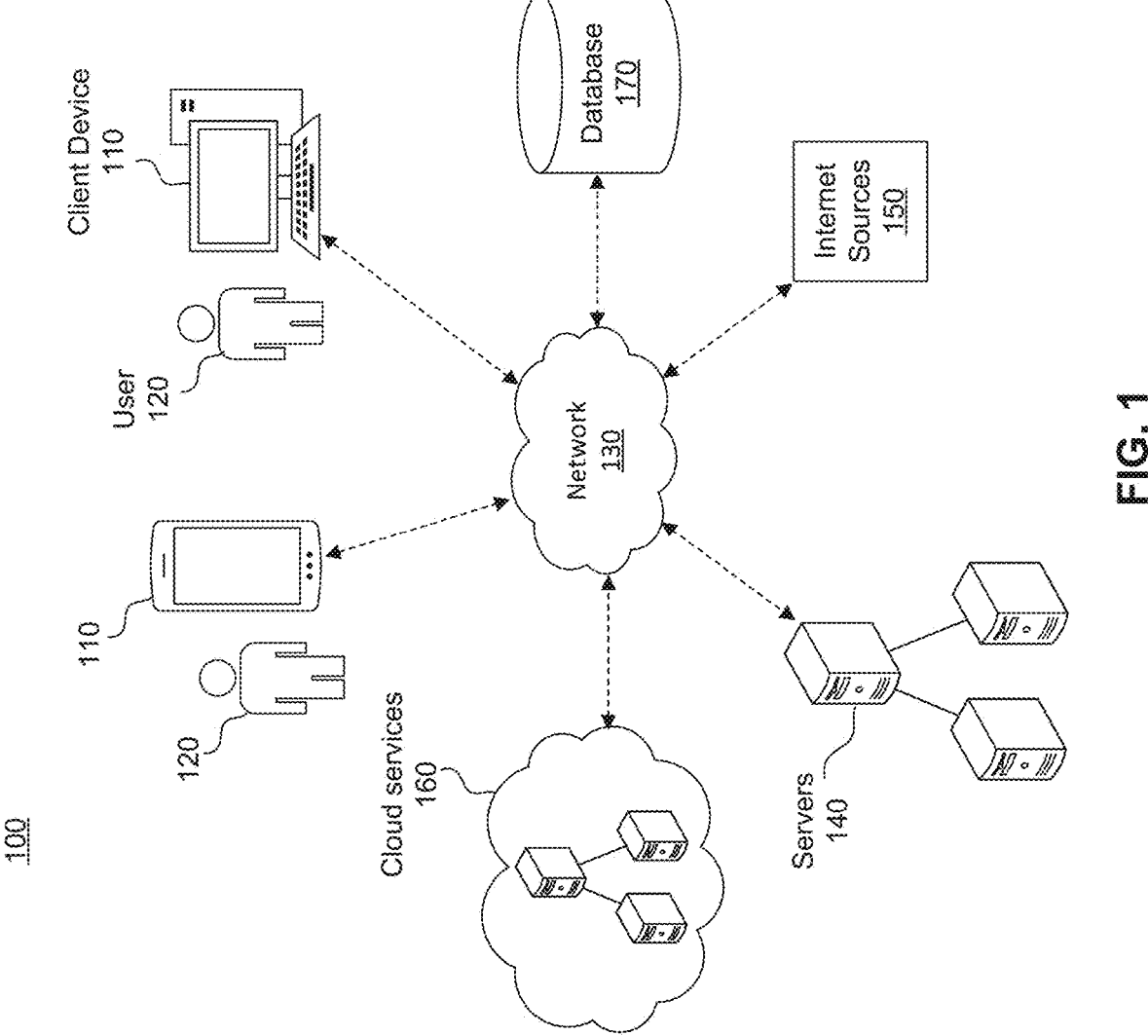
FIG. 1 is a diagram illustrating an exemplary system environment in which the disclosed natural language system may be used, consistent with disclosed embodiments.

The disclosed embodiments relate to a natural language processing system augmented with external knowledge sources and reasoning experts to generate useful, natural language output in response to natural language questions from a user. In prior natural language systems, language models are inherently limited. Language models are designed to provide a model described by the data on which they were trained. For example, a language model may be trained on huge quantities of text data and may be designed to determine relationships between words and phrases within the text data. In operation, the trained language model may receive text as user input and produce a response based on its training data. If the training data does not include information or enable the system to provide an accurate response to the user input, the generated response may be nonsensical or inaccurate. Although the natural language system may be optimized by fine-tuning the pre-trained model, a side effect of this fine tuning is that, while performance may be improved in the area of the fine tuning, performance may degrade significantly on other tasks. Thus, prior natural language systems are limited by their training even when further fine tuning is performed to improve performance.

In addition, natural language systems that are limited to only the information they were trained on may not have access to information that is only available after training. A natural language question provided as input to a natural language processor including a request that requires additional information outside of the training of a language model poses a challenge to natural language systems. For example, natural language systems based on prior language models cannot access proprietary information (e.g., a company database), they do not have access to current information (e.g., the latest COVID statistics, dollar-euro exchange rates or current stock prices), and they do not have access to current events information. Further, they are prohibitively expensive to update due to the cost of training and the fine tuning of the language models. In addition to limitations on information, current natural language systems are also limited in responses that require some forms of reasoning to provide an accurate response. For example, an accurate response to a natural language input requiring a complex mathematical operation (e.g., identifying natural language terms that describe a mathematical operation in free language) may not be possible due to the limitations of their training data and capabilities to generate responses that involve mathematical operations. Further, it is difficult for a natural language system, based on a language model on which it was trained, to answer simple questions that may require multiple steps. For example, prior natural language system may not have the capability to do an intelligent decomposition of the natural language question to determine what mathematical operation may be needed to allow the system to respond to the user input with an accurate natural language output. Thus, to respond to such complex inputs, the system may need to decompose the input into multiple parts, perhaps some parts requiring retrieving information from an external source not available to a natural language system at the time of training. Natural language systems reliant on their training data and limited capabilities to process complex natural language inputs may provide confusing and often inaccurate responses when multiple steps are required to respond to a composite question from a user.

One core limitation of previous large natural language systems is that they do not have access to all of the required knowledge needed to provide accurate responses to user inputs. There is a need for natural language systems capable of responding to user input including requests for information not available to the system at the time of training (e.g., information that was generated after the underlying models were trained). The disclosed embodiments provide methods and systems for natural language systems capable of providing a knowledge-based response that includes information from external knowledge sources. A second core limitation is that natural language systems based on neural models are not well suited for certain types of reasoning functions and calculations. There is a need for natural language systems that can perform certain reasoning tasks that the natural language system cannot perform well based solely on their training. The disclosed embodiments provide methods and systems for natural language systems that can generate a response including information from an external resource, including those capable of performing reasoning tasks. In the disclosed embodiments, an external resource or an expert resource may refer to a software-based module configured to perform one or more particular functions, a computer application (e.g., a calculator, etc.), a trained model, a database, etc. The disclosed systems include a trained language model that can interact with such external resources/experts in order to significantly expand the capabilities of the trained language model (e.g., when performing tasks associated with dynamically changing information, mathematical operations, current events, databases, etc.).

A third core limitation is the inability of current systems to respond accurately to complex questions. There is a need for natural language systems capable of performing multiple steps in response to a complex user input. The disclosed embodiments provide natural language systems and methods that can decompose a user input into multiple sub-parts, gather information regarding each sub-part and generate a natural language response based on the parts that is accurate and unambiguous in natural language.

As described in the sections below, the disclosed natural language systems may provide a user with the advantages of a language model and additionally provide access to external information not available when the language models were trained. Further, the disclosed natural language system may additionally provide access to reasoning modules with capabilities that augment limitations of the language model. The disclosed embodiments address the challenges described herein by adding knowledge and reasoning capabilities to linguistic processing. This is accomplished through the design of natural language systems that have a flexible architecture in which a trained language model is complemented with specialized models coupled with a processes to determine what parts of user input can be addressed using the language model and what parts of the user input require information from the discrete specialized modules and external information resources to respond accurately. In addition, the disclosed embodiments provide the ability to add or update specialized models without requiring a re-training of the language model, reducing cost and providing flexibility in system operation.

The augmentation of language models with external information allows natural language processing systems to handle tasks that are outside of the capabilities of neural models. In the example MRKL (Modular Reasoning, Knowledge and Language) system developed AI21 Labs, natural language input (e.g., input text to a graphical user interface) may be further processed by adding a routing component to the architecture. In embodiments, the system architecture may use a trained language model to decompose the natural language input into sub-parts. The sub-parts may be passed to a router, which may identify a specialized model, either a symbolic expert or a neural expert, to augment the function of the language model. The routing function may determine sub-parts to be directed to that language model to generate a response and sub-parts to be directed to specialized models to generate a response. In embodiments, the language model and/or the router may format information requests to the associated specialized model (i.e., information resource) to direct an information request to the specialized model to retrieve information to generate the response and provide the response to the user. It is to be appreciated that the format of the information request may be based on the input requirements associated with a corresponding information resource. Further, the information response may be converted to a format for processing by the natural language system consistent with the input requirements of the language model.

The disclosed embodiments may address the limitations of previous systems with an architecture that includes an extendable set of modules and a router that routes incoming natural language input, or portions of the incoming natural language input, to one or more modules that can best respond to the input. Further, the system may provide the interface between the language model, the router and the extendable set of modules such that the input requirements of information resources associated with retrieved information and input requirements of the information responses associated with the language model may be formatted properly. It is to be appreciated that in order to route requests to specialized models, the natural language question may be decomposed by a trained language model, for example, into sub-parts where the specialized models associated with each sub-part and the relationship between the sub-parts may be understood to enable the system to gather information needed to generate an accurate natural language response.

In one example, a language model may be ill-suited to do 4-digit arithmetic to respond to a specific user input, however, a calculator module available as a specialized model (i.e., expert) may perform arithmetic operations. In this example, the calculator can perform complex mathematical operations and would be better suited to perform 4-digit arithmetic than the natural language system based on a trained language model. The calculator may have a known application interface that a natural language system including a trained language model may call to execute the operation. The natural language system may format the information request to the calculator to meet the input requirements of the calculator then may convert the response from the calculator to a natural language format for use by the natural language system in generating an accurate response to the user input.

In another example, a natural language system may lack access to or may have not been trained on proprietary information sources, that might be stored in a database, necessary to generate a response. For example, access to a company database may allow a natural language system to generate accurate responses to queries involving contacts in a company sales database or information about inventory in a company warehouse. Thus, a natural language question that may require company database information may be converted to an SQL query (or other suitable database query format) to gather the information from the database. The information returned in response to a query may be converted back to a natural language format to generate the natural language output. As discussed in the sections below, accurate responses to complex questions requiring access to a company database can be generated using disclosed embodiments.

In another example, the disclosed natural language systems may offer the capability to interact with and return valid responses relative to current information (e.g., dynamically changing information, news, weather, stock prices, etc.). Certain data constantly changes. For example, the exchange rate between the dollar and another currency may continuously fluctuate. In another example, the weather (or forecast) for a specific location may change frequently. The design of traditional trained language models preclude their ability to keep up with such dynamically changing information. An external expert, however, may have access to this information and may be able to provide it to the language model such that it may be converted to a natural language format to allow a response to a user input to be generated and provided to the user. For example, a weather module may be called by the disclosed trained language models and may return information on the current weather in London. Further, an external expert may have access to websites to gather current or dynamically changing information as well as information that has changed recently. The disclosed trained language models may have access to external experts (e.g., via the router) and can connect to resources such as Wikidata to gather information to generate an accurate response to the user input.

The sections below describe in detail the functionality and features of the presently disclosed natural language systems augmented with external knowledge sources and reasoning experts. The sections also explain in detail how such systems may be constructed to include capabilities such as answering natural language questions (e.g., composite questions) that may include two or more sub-parts/sub-questions or that may require multiple steps to generate an accurate response. In some cases, the disclosed natural language system may include one or more trained machine learning language models trained to recognize complex contextual elements in text. For example, such models may be trained using large corpuses of text, masking different segments of text (e.g., tokens). Training may be based on one or more reward functions that penalize the model during training for generating incorrect responses (e.g., returning text that does not match masked segments), but reward the model for generating correct responses. Such trained systems, when placed into use may offer natural language capabilities such as generating well-written responses in response to text-based user input.

In some embodiments, the trained language model may decompose a natural language input into parts of the user input that may be addressed by the trained language model and parts that cannot be addressed with the trained language model alone (e.g., portions of the user input that implicate information or tasks associated with specialized models, external information sources, external applications (e.g., calculators, etc.), among many others). It should be noted that throughout the present disclosure, the described user input may be received as natural language text entered through any suitable means, such as through the use of a keypad, keyboard, or other user input device or via one or more microphone-based systems configured to capture audio signals associated with input from a user and, e.g., convert the received audio signals to text representative of the user input. Further, the user input may be received in the form of one or more questions, one or more commands, one or more statements, etc. In some embodiments, specialized models may include trained models designed to perform specific tasks and to which information requests may be routed. Additional details regarding training of the language models and specialized models associated with the disclosed natural language system are discussed in more detail in the sections below.

Before turning to the details, it should be noted that the disclosed natural language systems and their associated GUIs may be employed together with any type of computer-based technology. For example, such systems may be incorporated into computer software, search tools, mobile applications, or any other type of computer application. Additionally, the disclosed systems may be operated on a PC, server, tablet, mobile device, laptop, heads up display unit, or any other type of hardware system capable of executing an application including natural language system functionality. User input may be provided using any suitable input device (e.g., keyboard, keypad, touch sensitive screen displaying virtual keys, voice sensitive microphone/audio processing hardware and software, etc.). Similarly, output generated by the disclosed systems may be provided to the user using suitable devices, such as display devices, speakers, etc.

Reference will now be made in detail to exemplary embodiments, examples of which are illustrated in the accompanying drawings and disclosed herein. The systems and methods are described below in no particular order and can be performed in any order and combination. Additionally, various embodiments of the disclosed natural language system technology may include some or all of the disclosed features and functionality in any combination.

The disclosed embodiments describing natural language systems include one or more language models and augment them with external knowledge sources as well as reasoning experts that can handle tasks that lie beyond the reach of neural models.

FIG. 1 provides a diagrammatic representation of an exemplary system environment in which a disclosed natural language system may be employed. For example, system 100 may include a plurality of client devices 110 operated by users 120. System 100 may also include a network 130, server 140, internet resources 150, cloud services 160, and databases 170. The components and arrangement of the components included in system 100 may vary. Thus, system 100 may include any number or any combination of the system environment components shown or may include other components or devices that perform or assist in the performance of the system or method consistent with the disclosed embodiments. The components and arrangements shown in FIG. 1 are not intended to limit the disclosed embodiments, as the components used to implement the disclosed processes and features may vary. Additionally, the disclosed natural language system may be implemented on any single component shown (e.g., a single mobile device or single PC included in client devices 110) or may be implemented in a network architecture (e.g., one or more features of the disclosed natural language system systems and methods being implemented on a server 140, associated with one or more cloud services 160, etc. and having connectivity established with one or more client devices 110 via network 130 (e.g., a WAN, LAN, Internet connection, etc.).

As shown in FIG. 1, client devices 110 may include a variety of different types of devices, such as personal computers, client terminals, supercomputers, and mobile devices like smartphones and tablets, etc. Client devices 110 may be connected to a network such as network 130. In some cases, a user 120 may access the natural language system and its associated functionality via the client device 110 which can display the user interface of the natural language system. For example, the natural language system may be operated as a stand-alone application on a client device 110, or the natural language system may be incorporated into any suitable applications (e.g., browsers, search engine interfaces, chat tools, database management applications, document editing applications, etc.) that may be operated on a client device 110 (or other types of computing devices).

Network 130, in some embodiments, may comprise one or more interconnected wired or wireless data networks that receive data from one device (e.g., client devices 110) and send it to another device (e.g., servers 140). For example, network 130 may be implemented to include one or more Internet communication paths, a wired Wide Area Network (WAN), a wired Local Area Network (LAN), a wireless LAN (e.g., Bluetooth®, etc.), or the like. Each component in system 100 may communicate bidirectionally with other system 100 components either through network 130 or through one or more direct communication links (not shown). In some embodiments, the disclosed natural language systems may be configured to exchange information (e.g., user input, information received from one or more resources, etc.) among client device 110, database 170, server 140, cloud service 160, and/or Internet sources 150 (among others). The disclosed natural language systems can be incorporated into client devices 110 and run locally or be run on a server 140 or from a cloud service 160 accessed by the client device 110 via network 130.

As noted, the natural language system may be operated as a standalone application offering its own GUI or may be incorporated into another application (e.g., a parent application) and may offer one or more GUI interface components to the parent application. For example, the natural language system GUI (or parent application GUI supplemented with natural language system features) may provide a location, field, etc. to receive user input (e.g., a text entry window, etc.). GUIs associated with the disclosed natural language system may also provide one or more windows or fields for receiving user input and one or more additional windows or fields for providing text output options in response to received user input. The windows, fields, and/or functions of the natural language system may be selectively activated or deactivated. The user input may include words or any other type of text that can be inputted by the user using a keyboard or other appropriate input device or method, including dictation by the user using voice recognition software. Multiple embodiments and examples of the natural language system GUI along with various features associated with the disclosed natural language system are discussed in the sections below. In alternate embodiments, a software API may be provided for providing access to the disclosed natural language system. For example, an application operating on client device 110 may interface with the disclosed natural language system via the API to retrieve a free language response to user input received via the application. It is to be appreciated that the natural language system may receive input and generate a response to the input via a graphical user interface, a software application, a web query, an SQL query, voice activated system and the like.

In some embodiments described herein, the natural language system may receive user input including one or more words (i.e., natural language input) and, in response, retrieve information from an external knowledge source based on attributes associated with the user input. In some embodiments, the natural language system may decompose the user input into sub-queries, sub-parts, separate information requests, etc. The user input (e.g., a natural language question) may involve a simple question (e.g., what is the population of Berlin) or may involve more complex questions (e.g., which has a larger population, Tel Aviv or Berlin) that can be decomposed into sub-questions or information requests (e.g., what is the population of Tel Aviv, what is the population of Berlin, which result is larger) in order to provide an accurate answer to complex or multi-part questions. Natural language questions received from a user may also include or refer to mathematical operations, current events, dynamically changing information, database queries, etc. The trained language model may decompose the user input into one or more information requests each associated with information to be requested from external knowledge sources (i.e., information resources), an operation to be provided by an available application, information stored in a database, etc.

The natural language system may also be configured to automatically identify information that may be missing from input that a user may provide to the system. For example, the user input can be a collection of words that convey at least one idea. Based on analysis of the user input, the natural language system may detect the absence of information that is not conveyed by the input but that may be relevant to the user input. In such cases, the natural language system may prompt the user, through the natural language system GUI, for example, to enter additional user input (e.g., secondary user input) associated with the missing information. Through any suitable interface element, the natural language system may receive the secondary user input that may include details associated with the missing information. The natural language system may then generate a response to the natural language question considering information received in the secondary user input.

Consistent with disclosed embodiments, the natural language system may construct natural language output (e.g., text output) based, at least in part, on access and reliance upon sources of external information (e.g., outside of what the user inputs, outside of or remotely located relative to a device, such as a PC or mobile device, on which the natural language system is implemented, etc.). As shown in FIG. 1, for example, the system may access Internet sources 150, databases 170, or any other remotely located devices or data repositories, etc. via network 130.

In some cases, information retrieved or accessed from the remotely located devices or databases, for example, may be used by the natural language system in various ways. In some instances, the natural language system may use such information to determine an accurate answer to a natural language question. For example, the natural language system may use the externally available information to retrieve information about a current event, dynamically changing information (like stock price, weather forecast, exchange rate) etc. In other words, the natural language system can retrieve information from an external knowledge source to be used in generating the response to a natural language question from a user. The disclosed natural language system, including at least one trained language model, can decompose a natural language question received from a user into one or more (e.g., two or more) information requests needed to answer the received question. Each information request may be associated with a particular information resource.

For example, a user may ask a natural language question such as, "How much would it cost to buy 70 shares of GE stock?". In response, the natural language system including one or more trained language models, may decompose the user input question into sub-questions or information requests associated with particular information resources. For example, the decomposition of the user input may include a call to a stock price website or search engine with an information request corresponding to the sub-question: "what is the current price of GE stock?" The decomposition may also include a call to a calculator application formatted according to input requirements associated with the calculator application (e.g., "[retrieved current price of GE stock]×70="). The trained language model may use the output of the various information resources to construct a natural language output. For example, if the received current stock price of GE was $31.56 (as of Apr. 14, 2024 at 10:15 am Eastern US time) and the corresponding output of the calculator application was (31.56)×70=2209.2, then the trained language model may generate a natural language text output such as: "As of Apr. 14, 2024 at 10:15 am Eastern US time, a purchase of 70 shares of GE stock would require $2,209.20."

To provide the user with an understanding of how the information conveyed by the natural language output was obtained and how the user's question was decomposed into sub-queries/information requests, the disclosed systems may also provide additional output(s). For example, the additional output(s) may include indicators associated with the information request(s) decomposed from the user's natural language question. The output(s) may also include indicators of the information responses received from the at least one information resource. In the example above, the additional outputs may read as: "Current stock price of GE (at 10:15 am Eastern on Apr. 14, 2024)=$31.56 (retrieved from stockprice.com);" and "31.56×70=2209.2." Providing such a log of tasks associated with generating the natural language response to the user can be important in promoting user confidence in the accuracy of the output information provided.

Information resources may include a multitude of different types of information repositories, databases, applications, etc. Such information resources may be Internet-accessible, proprietary, local to particular client devices, etc. Information resources may include calculator applications; search engines; web-based news outlets; Wiki pages; websites; expert modules including one or more trained models configured to generate a specialized result based on an expected class of model input information; proprietary databases; Internet-accessible databases; among many others.

The external knowledge/information sources may be pre-selected by the user, be pre-set, or automatically selected based on the user input or the attributes associated with the user input. Relevant information in the external knowledge source can be identified automatically based on the attributes associated with the user input. For example, if the user does not want the natural language system to access the Internet, the user may block that capability. In this case, the natural language system may call on information that is stored locally on a personal computer, smart phone, or other client device. It is to be appreciated that the external knowledge source may be external to the trained language model of the disclosed systems and may include a local information source (e.g., residing on client device 110) or one that is housed on a remote network, another server, or another remote location. The external knowledge source could be, for example, a database containing proprietary company information. In another example, the external knowledge source may also be a webpage or an electronic document accessible via the Internet.

Figure 2:
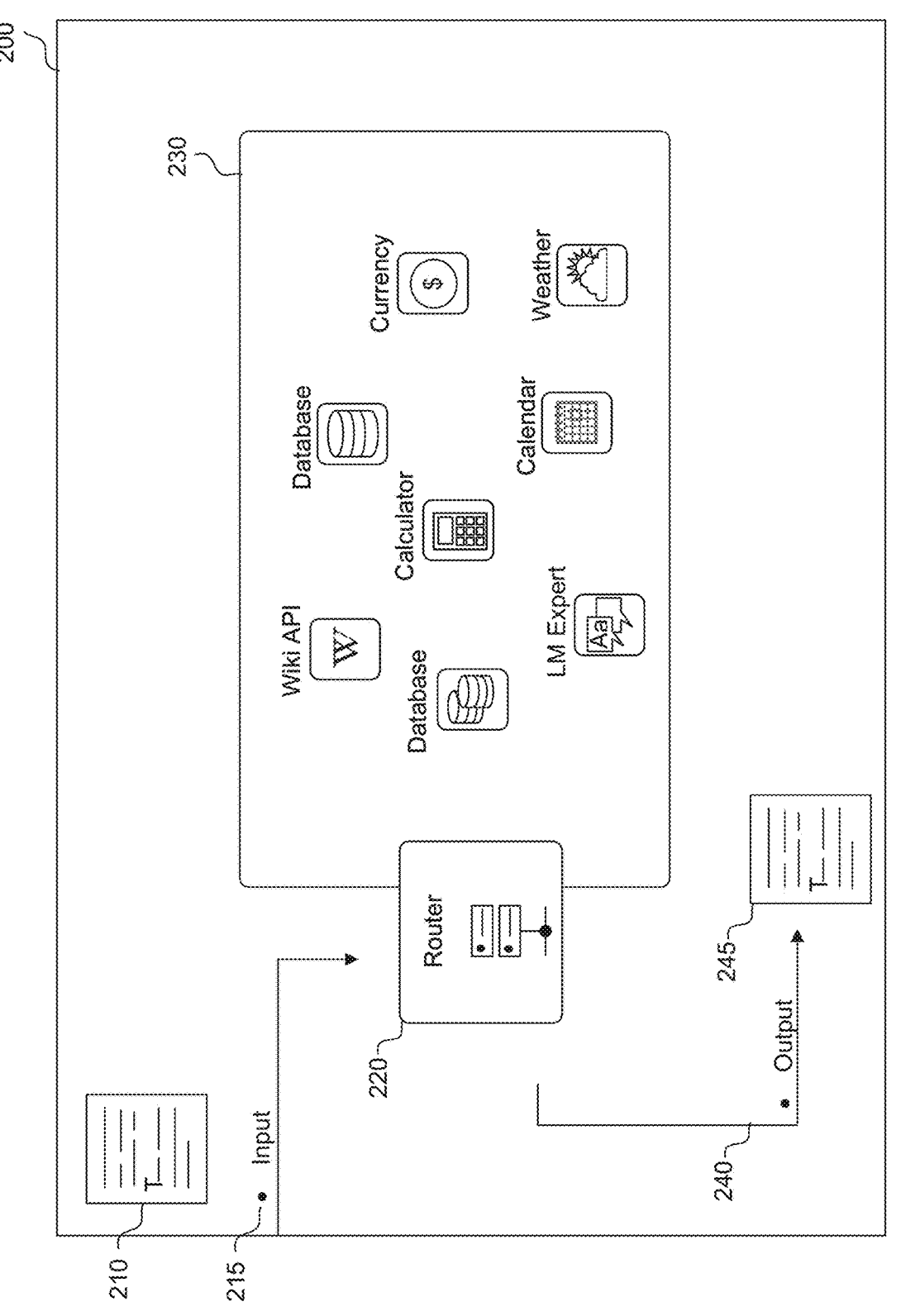
FIG. 2 is a block diagram illustrating an exemplary system which the disclosed natural language system may be used, consistent with disclosed embodiments.

FIG. 2 shows a block diagram representative of exemplary information flow associated with the disclosed systems. For example, an environment 200 may include a text entry window 210 of a graphical user interface associated with the disclosed system. Text entry window 210 may be configured to receive natural language text input from a user. As described above, one or more trained language models of the disclosed system may decompose user input received via window 210 into sub-queries or information requests. A router 220 may then route the sub-queries or information requests to one or more expert modules 230 (e.g., information resources) available in environment 200. The expert modules may return information responses (e.g., stock price, weather forecast for a particular city and date, resultant of a requested mathematical operation, etc.) in response to each of the routed information requests. The one or more trained language models of the disclosed system may aggregate the received information responses and generate a natural language output 240, which may be provided to the user via output display 245, for example.

The components and arrangement of the components included in system 200 may vary. Thus, system 200 may include any number or any combination of system environment components. For example, the expert modules depicted in the plurality of expert modules 230 in FIG. 2 include an API module providing access to a Wiki website, two database modules, a calculator module, a calendar module, a weather module, a currency module and a language model expert module It is to be appreciated that the number and type of expert modules is not limited to those shown in FIG. 2 and may include any number or type of module that may be needed to augment the capabilities of the trained language model(s) of the disclosed natural language system.

Router 220 may be implemented in any suitable manner. In some examples, router 220 may include algorithms or trained models configured to received generated information requests, identify suitable information resources, and convey the generated information requests to the information resources. In other cases, router 220 may include the one or more described trained language models responsible for decomposing the natural language user input into the one or more information requests. For example, the router 220 may decompose the user input text received via window 210 into sub-parts/sub-queries/information requests. Router 220 may then identify or select expert module(s) 230 based on each information request.

In the disclosed system, the decomposed user input text 210 (e.g., the generated information requests) may be analyzed to determine the relationship between the requests in order to better inform expert selection and/or natural language output generation based on information received from experts 230. For example, the user input text may consist of a natural language question that may require multiple steps and multiple information responses from expert modules

230 to generate an accurate response. These relationships, as determined, for example, by the described one or more trained language models of the disclosed system may be important in not only determining what information is needed to answer the question, but also how to construct or frame the response in a way that answers the user's question/makes sense to the user.

In embodiments, the router 220 may format information requests to expert modules 230 to meet the input requirements of the expert modules 230 or information resources associated with the information requests. For example, router 220 may convert the information response to a format that may meet the input requirements of a particular information resource (e.g., a calculator, search engine, etc.).

As the flow represented in FIG. 2 indicates, the capabilities of the presently disclosed system are not limited to the information used to train the one or more language models associated with the disclosed system. Indeed, where the trained language model determines that a user input is outside the scope of information to which it has been exposed, relates to dynamically changing information, seeks current events, requires mathematical operations, etc. the trained language model performs an intermediate step of decomposing the user input into appropriate information requests, routing the requests to appropriate, accessible experts, and then constructing a natural language output based on the information received from the experts. In this way, the capabilities of the current system in providing accurate responses to questions requiring complex math operations or relating to current events/dynamically changing information are limited only by billions of currently available expert resources potentially accessible to the system. And, as additional expert resources continuously become available, the capabilities of the presently disclosed systems will continue to grow-all without requiring new training to the language model(s).

FIG. 3A is a flowchart showing an exemplary process 300 for a natural language system directed to the conversion of the user input into sub-parts by a trained language model consistent with disclosed embodiments. The natural language system may include or may have access to external expert modules, as described above, and the language model may, based on the conversion of the user input into sub-parts, direct one or more information requests to information resources to augment the capabilities of the language model. The natural language system may be comprised of a computer readable medium including instructions that when executed by one or more processing devices cause the one or more processing devices to perform a method to respond to a natural language question that may require multiple steps to answer. As shown in step 305 in process 300, the medium may include instructions that receive a user input that includes a natural language question. In one example, the natural language question may be entered in a graphical user interface as natural language text. As shown in step 310, the process may use a trained language model to decompose the natural language question into two or more information requests (e.g., where a user input includes a multi-part question or otherwise requires information or operations from two or more experts in order to answer question of the user input). At step 315, the two or more information requests may be routed to at least one information resource (e.g., one of experts 230). Note that two or more information requests may be routed to the same expert (e.g., calculator, website, search engine, etc.) to retrieve corresponding information responses. At step 320, two or more information responses may be received from the at least one information resource in response to the two or more information requests. At step 325, the trained language model may generate a natural language response to the user's input question based on the two or more information responses received from the at least one information resource. At step 330, the natural language response may be provided to the user.

The parts of the natural language question may be associated with an information resource that may provide information not available to the language model at the time of its training (e.g., information generated after the language model was trained). Further, the trained language model may be static, meaning the model remains unchanged without exposure to additional training.

FIG. 3B is a flowchart showing another exemplary process 350 for a natural language system directed to the conversion of the user input into sub-parts by a trained language model consistent with disclosed embodiments. Similar to the process represented by FIG. 3A, process 350 includes a step 355 in which user input including a natural language question is received. At step 360, a trained language model is used to decompose the natural language question into one or more information requests. The one or more information requests may be formatted based on input requirements associated with a particular information resource (e.g., a series of numbers and mathematical operators for a calculator application; an SQL formatted query for a database operation; etc.). At step 365, the one or more information requests may be routed to one or more corresponding information resources (e.g., one of experts 230). At step 375, at least one information response may be received from the at least one information resource in response to at least one information request. At step 380, the trained language model may generate a natural language response to the user's input question based on the at least one information response received from the at least one information resource. At step 385, the natural language response may be provided to the user.

Figure 4:
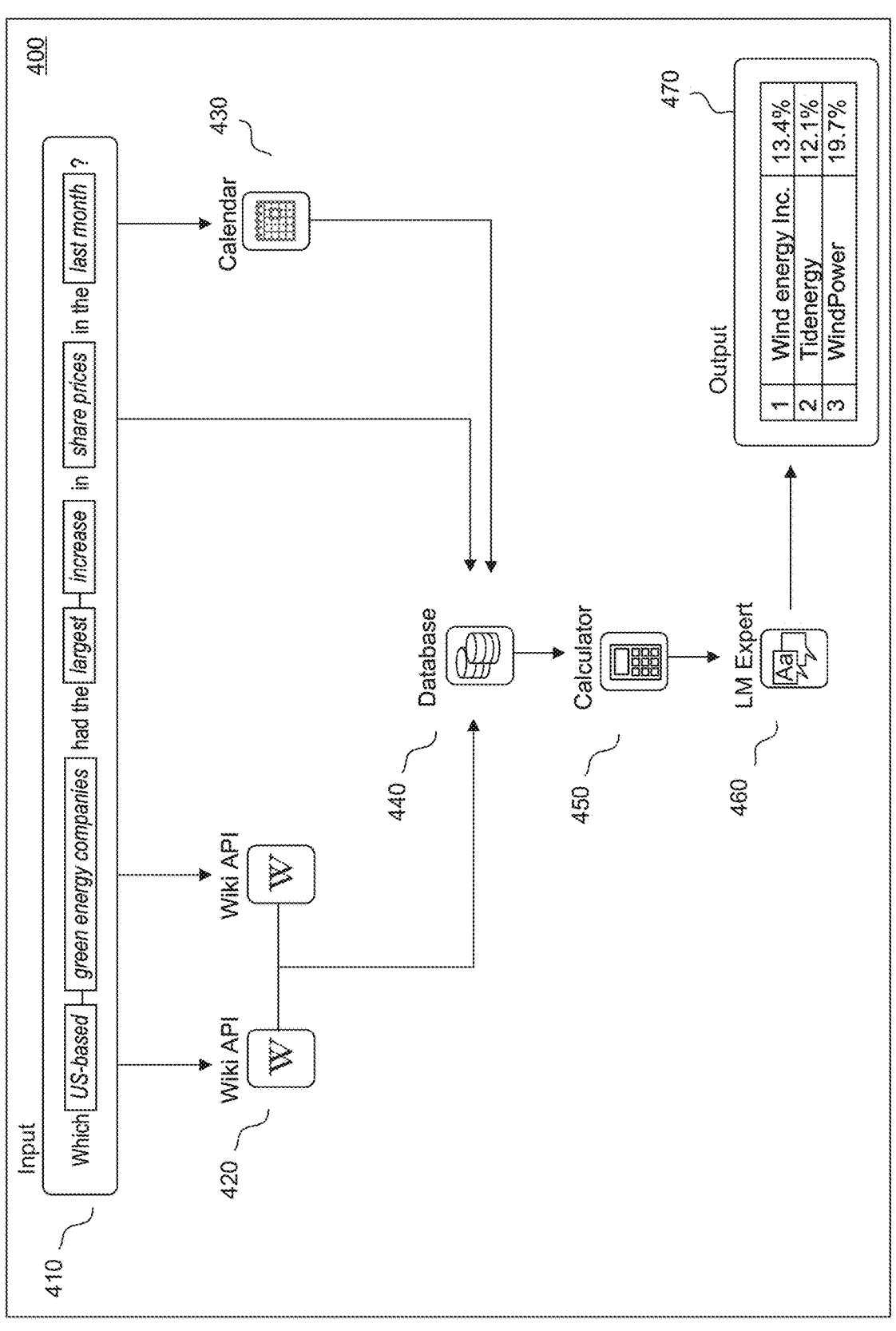
FIG. 4 is a block diagram illustrating an exemplary system which the disclosed natural language system may be used to decompose a composite question to generate an answer.

FIG. 4 diagrammatically represents a process 400 involving decomposition of a natural language question (e.g., a composite or multi-part question) into sub-parts as described in step 310 of process 300. Once the natural language question has been decomposed, e.g., at step 315 of process 300, the information requests may be routed to one or more information resources. In addition to the language model on which the natural language system was trained, the router may direct information requests to multiple experts to retrieve information that may be needed to generate the response to the natural language question.

In the example of FIG. 4, the natural language question is entered into user input window 410. The trained language model may decompose the natural language question into multiple sub-parts/information requests, and the router may direct one or more sub-parts to the associated expert module. The natural language question in the example is "Which US-based green energy companies had the largest increase in share price in the last month?" Boxes surrounding various words and phrases of the user input represent how the natural language question may be decomposed into multiple sub-parts and routed to associated expert module(s). For example, one or more information requests associated with determining a list of green energy companies, and specifically green energy companies based in the US, may be routed to Wiki API module 420 to get up-to-date information. Similarly, an information request associated with determining the month corresponding to "last month" may be routed to a calendar expert 430.

The natural language question input by a user may involve multiple steps and information from multiple information resources to generate an accurate answer. In the example of FIG. 4, responses from the Wiki API 420 (e.g., a list of US-based green energy companies) and from the calendar application 430 (the 30 days prior to a current date) may be received, and a query may be generated and routed to database 440. For example, the trained language model(s) may generate a query to a stock price database. The query may be formatted specifically for database 440 (e.g., an SQL formatted query, etc.) or may be provided in natural language format where compatible with database 440. The query to database 440 may be performed with a single command/request or may be performed using multiple commands/requests. For example, for each US-based green energy company retrieved from Wiki, an initial share price (e.g., a price at closing 30 days ago) and a current share price may be retrieved from database 440. To determine the companies that had the "largest increase" in share prices in the last 30 days, the trained language model may generate a series of mathematical operation requests and forward those requests to calculator 450. In the example, each calculator request may be formatted according to the input requirements of the calculator application 450. For example, for each US-based green energy company, the trained language model may send to calculator 450 a request formatted as: "((([current stock price]−[initial stock price])/[initial stock price])×100)." Just as information responses were retrieved from Wiki API 420 and calendar 430, similar information responses may be retrieved from calculator 450. With the responses from the calculator 450 (and the previous responses from Wiki API 420 and calendar 430), the trained language model 460 has the information needed to provide a natural language output 470 in any appropriate format. For example, the output 470 may be provided (e.g., on an electronic display device) using one or more natural language sentences, or the natural language output may be formatted in a chart as shown in FIG. 4. In this example, the "largest increase" may be interpreted by the trained language model as corresponding to the single corporate entity, among the list of green companies, that achieved the largest increase in stock price over the previous 30 days. In other cases, the trained language model may interpret "largest increase" as corresponding to a group of companies whose stock price increased the most of the previous 30 days. In the particular example of FIG. 4, the inclusion of the plural form "companies" in the user input would inform the trained language model that the user is seeking a list of companies whose stock prices appreciated by significant amounts rather than just the single company that achieved the largest stock price increase. Thus, the output 470 includes three entries whose stock prices all appreciated by more than 12%.

The trained language model could choose to include in output 470 any number of two or more companies to answer the question in the user input in this case. Should the user wish to expand the list of companies included in the output, a refined request such as "Which ten US-based green energy companies had the largest increase in share prices in the last month?" Such an input would result in an output list similar to the list in output 470, but including ten entries (assuming information for ten companies was retrieved). As other potential refinements, the user could request an alphabetized output list (either with the initial user input or after output 470 is generated). The user could also request the output to be ordered by percentage increase from largest to smallest, etc.

In some embodiments, multiple information requests may correspond to a common information resource. For example, FIG. 4 shows two sub-parts directed to Wiki API. During decomposition of the user input, it was determined that information should be received from the same information resource for those two sub-parts. In some embodiments, the information resource may be associated with a calculator application (as shown in FIG. 4 calculator module 450). In some embodiments, information responses from the information resource may include results from a search via a search engine. In some embodiments, the information resource may correspond to at least one of a news outlet, a Wiki page or a website available via an internet connection. For example, the natural language question may contain a sub-part that requires current affairs information to be retrieved from the information resource. The information resource may be a website that contains up to date information pertaining to the news of the day (e.g., Reuters news service). In such an example, text associated with current affairs information may be included in the natural language response based on the information response received from the information resource. Further, information requests may correspond to information resources relating to dynamically changing information. For example, the dynamically changing information may include weather information, currency exchange rates, stock prices, the news and the like. It is to be appreciated that information requests as described herein may relate to information generated after a time at which training of the trained language model was completed. Further, during decomposition, the trained language model may be capable of identifying parts of the natural language question that may not have been included in its training dataset to be able to direct information requests appropriately (or provide one or more inquiries to the user seeking clarification and/or additional information).

In some embodiments, the information resource may include an expert module including a model trained to generate a specialized result based on an expected class of model input information. For example, trained models may be developed to perform specific tasks associated with experts that the information requests are routed to (e.g., neural models).

In some embodiments, multiples steps are taken to generate the natural language response. For example, as shown in FIG. 4, the natural language question requires information associated with multiple sub-parts to be retrieved and that information is then used in subsequent processing to generate the natural language response. Further, the natural language response may include information corresponding to the steps taken to generate the response. Thus, the method performed may include outputting, to the user, indicators associated with the information requests decomposed from the natural language question and the information responses received from the information resources. For example, an output generated in FIG. 4 may include text referencing that the list of companies was retrieved from WikiData. Additionally or alternatively, the method performed may include outputting, to the user, a log of tasks associated with generating the natural language response to the user (e.g., the initial information requests to Wiki, the set of mathematical operations provided to the calculator, a list of results retrieved from the calculator, etc.). It is to be appreciated that identifying the steps taken and information gathered to generate the response and proving those in the display in the output to the user may build trust in the accuracy of the natural language response.

Reference will now be made in detail to exemplary embodiments representative of system architecture including specialized models, examples of which are illustrated in the accompanying drawings and disclosed herein. Additionally, various embodiments of the disclosed natural language systems may include some or all of the disclosed specialized models, features and functionality in any combination.

As illustrated in the example of FIG. 4, a calculator expert 450 may be accessed as a specialized module to perform certain mathematical operations (e.g., operations with complexity greater than simple single digit addition). Previous natural language systems tend to perform poorly with respect to mathematical operations. The reason lies in how the systems were trained and the inherent limitations of that training. For example, a child may learn math from rules, not only by memorizing examples. In contrast, language models are designed to learn from examples, and consequently are able to solve very basic math like 1-, 2-, and possibly 3-digit addition, but struggle with anything more complex. With increased training time, better data and larger models, the performance will improve, but will not reach the robustness of a simple handheld calculator.

In the disclosed embodiments, the trained language model does not rely solely upon its training to produce outputs requiring mathematical operations. Rather, the trained language model can interpret a natural language input and determine particular mathematical operations required by the input question. Rather than performing these operations (or estimating the answer to the operations), the trained language model can generate formatted requests to an external expert, such as a calculator application. That is, a mathematical problem may be phrased in natural language by the user and converted by the trained language model (and/or a router) to a format required by a calculator. The computation may be performed by the expert application, and the answer may be returned and converted by the trained language model back into free language for display to the user. Importantly, the process may be made transparent to the user by revealing the computation performed, thus increasing the trust in the system. In this way, the trained language model, even in a static state without updated training, can continue to do what it's good at, while relying upon external experts to provide information or calculations, etc. outside the trained language model's capabilities. In contrast, prior language models do not make use of such external resources and instead provide answers which might seem reasonable, but are wrong, making them impractical to use.

Figure 5:
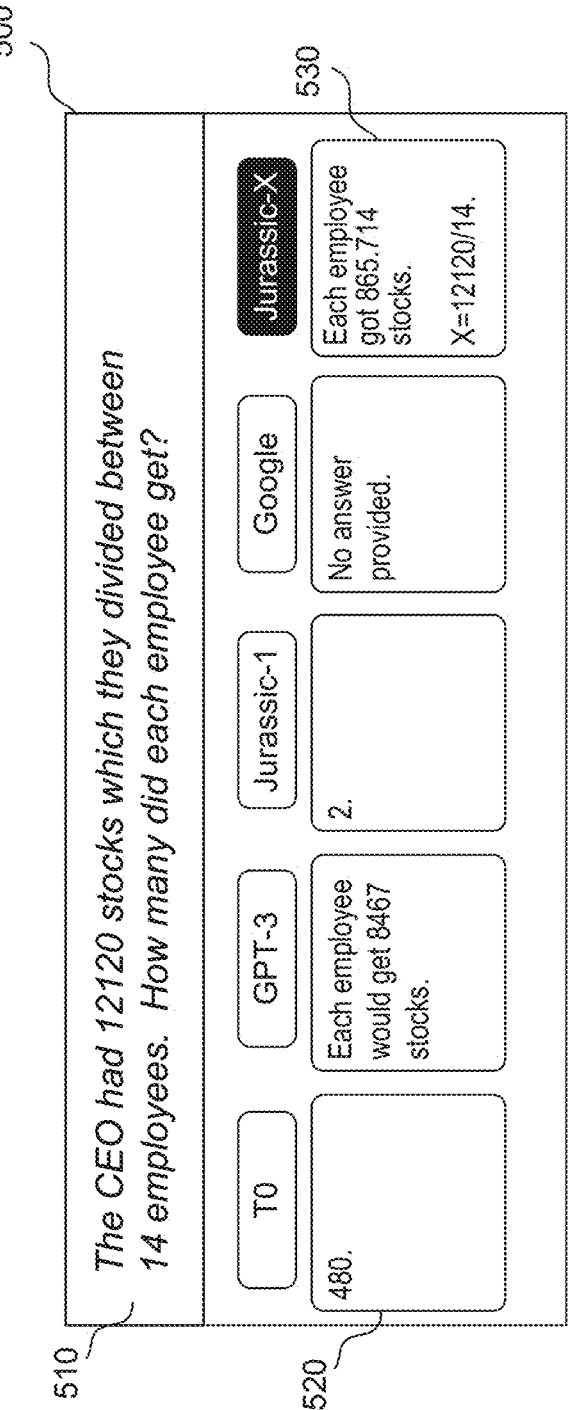
FIG. 5 shows answers from different natural language systems to a user input that requires a mathematical operation to respond.

FIG. 5 illustrates an example comparing the performance and output provided by the disclosed systems (e.g., as included in the current Jurassic-X system), as compared to other systems that do not offer the capabilities of the disclosed systems. In the example of FIG. 5, a user has entered into a text entry window 510 a natural language question, "The CEO had 12120 stocks which they divided between 14 employees. How many did each employee get?" Using the techniques described above, the disclosed system (e.g., Jurassic-X), rather than estimating an answer to the question on its own, decomposed the user input into an information request formatted for a calculator application. Specifically, the trained language model of Jurassic-X produced a calculator application request such as: "12120/14=" in order to determine a number corresponding to the number of stocks each of the 14 employees received after the division of the original 12120 stocks. The result returned to the trained language model by the calculator was 865.714. Next, the trained language model generated a natural language output based on the result received from the calculator. Specifically, as shown in output box 530, the trained language model of Jurassic-X returned the sentence: "Each employee got 865.714 stocks." Importantly, the trained language model also generated as part of the output an indicator of the steps taken or calculation requested in order to determine the result. As shown, the trained language model of Jurassic-X also returned the mathematical phrase, "X=12120/14" indicating that in order to determine how many of the original 12120 stocks each of the 14 employees received after the division, it was necessary to calculate the variable X as 12120/14. In this way, Jurassic-X provides transparency to the user of the steps taken to reach the result and, in turn, provides confidence in the answer generated.

The output generated by several other systems in response to the same user input is also shown in FIG. 5. Specifically, TO generated nothing more than the incorrect response, "480." GPT-3 generated the sentence, "Each employee would get 8467 stocks." The language aspects of the answer are well-formed, but the mathematical result (i.e., 8467) is incorrect. Moreover, there is no indication of how GPT-3 arrived at the result, leaving the user to wonder how the answer was determined and whether the answer is correct. Google did not provide a response.

In disclosed embodiments, a natural language system may be capable of retrieving information from a database or updating a database using free language input. For example, a user may provide an input that implicates data stored in one or more databases (e.g., publicly available databases, proprietary databases, etc.). In one example, the user may request, "Did we have more sales in 2022 from Santa Monica or from San Juan?" In response, the trained language model may decompose the user input into corresponding information requests (e.g., "what were the 2022 sales in Santa Monica," and "what were the 2022 sales in San Juan") and route those requests to one or more databases. The information requests may be formatted, for example, in database query format (e.g., SQL, etc.). Based on results returned in response to the database queries (e.g., 2022 sales, Santa Monica: $2.43 M; 2022 sales, San Juan: $45.67 M), the trained language model may generate a natural language output, such as "In 2022, we had more sales in San Juan than in Santa Monica." Such a request may also involve one or more other expert resources/applications. For example, a calculator or other mathematical resource may be called with the results provided by the database, and a COMPARE function may be initiated to determine the greater of the two retrieved amounts ($2.43 M vs. $45.67 M). The trained language model may also generate, as part of the output, indicators of how the result was obtained:

"2022 sales, Santa Monica: $2.43 M"

"2022 sales, San Juan: $45.67 M."

"$45.67 M>$2.43 M."

In some embodiments, the method performed may include using the trained language model to generate a database update command based on natural language update information received from the user. In other words, the user may interact with and update database entries using natural language input. Such input may refer to data entry (e.g., "add a sale of $124, from client X") or may direct a structural change to a database (e.g., "add a column for entry of client country code"). The database may be updated based on the database update command. Further, the method may include providing confirmation to the user of the changes made to the data based on the database update command.

As described earlier, the database may include proprietary information. The proprietary information may correspond to company inventory, suppliers, employee information, payroll for a company and the like. It is to be appreciated that the proprietary information may not be publicly available. For example, the database may be stored on a server local to the natural language system (e.g., access to the database would not be made via an internet connection). One unique feature of using a database as a specialized model in coordination with a natural language system is that the response to the natural language question may further include a change or an update to information in the database based on the at least one sub-query. The advantage being that, using free language, a user may "talk" to their database to access information and update the information. This is as opposed to, for example, using a structured configuration management tool or a software application that follows a more rigid set of rules. In some embodiments, the natural language question may further include a second sub-query associated with a second database. For example, the natural language question may identify information in more than one database that may be needed to respond to the question. This enables the ability to join databases, interacting with multiple databases using free language and provides even greater utility to the user in a natural language system designed with several databases serving as specialized models that the system can interface with.

Figure 6:
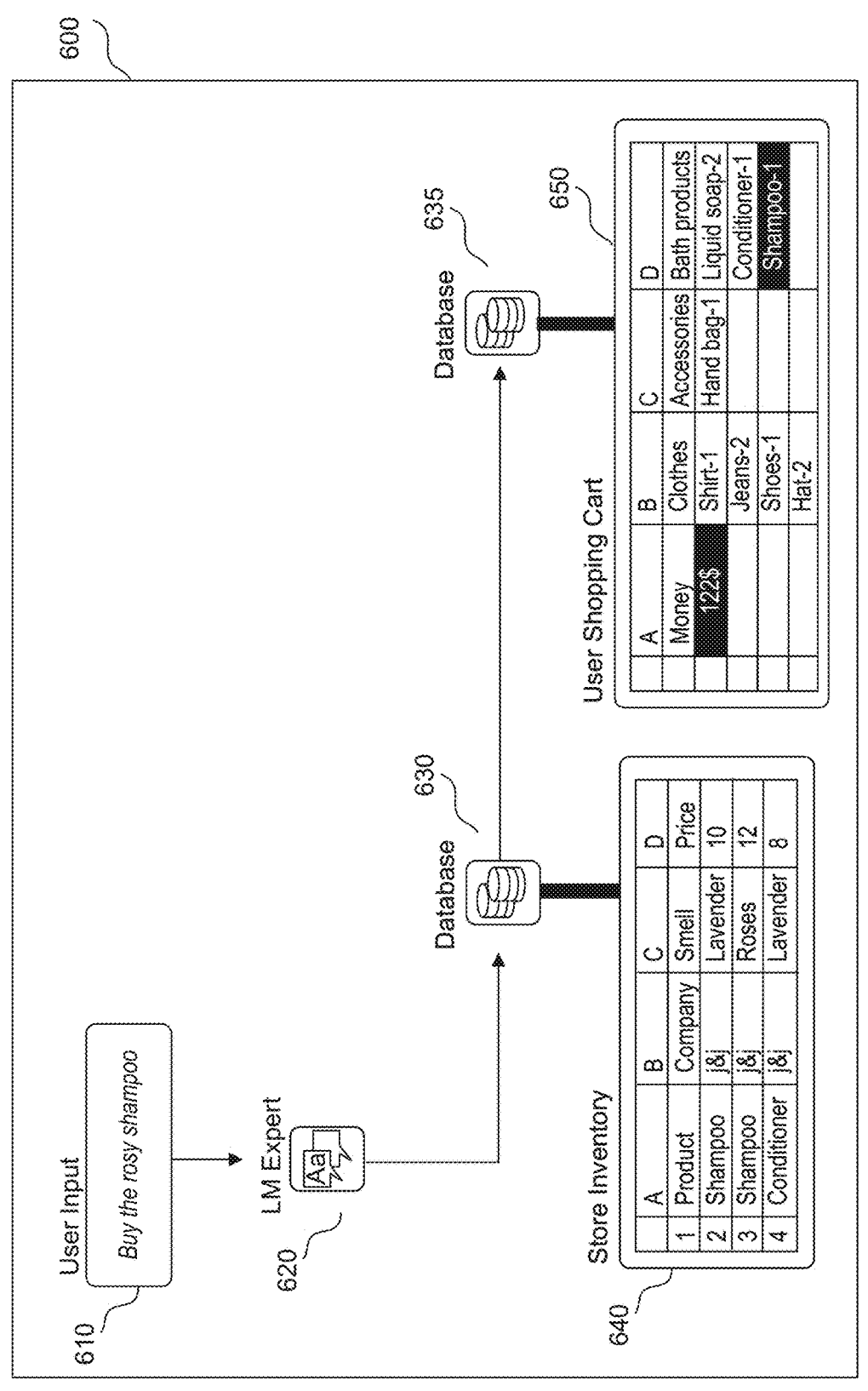
FIG. 6 is a block diagram illustrating an exemplary system which the disclosed natural language system may access an external database to generate a response.

FIG. 6 shows an example of a natural language question used to interact with a company database using the trained language model(s) of the disclosed systems. User input 610 includes the user input, "Buy the rosy shampoo". The natural language system receives the user input 610 including the natural language question. The LM Expert 620 (e.g., the trained language model) may decompose the natural language question into sub-parts understanding that each sub-part initiates an information request based on an association made with information stored in a database not available to a trained model of the natural language system (or previously encountered during training of the model). The LM expert 620 may direct at least one of the sub-parts to a database 630 to retrieve information from the database corresponding to the information requests associated with the decomposed user input. For example, database 630 may include a store inventory 640 including information about shampoo and other products. In one example, an information request from LM expert 620 may prompt a search of inventory 640 for shampoo that has a rosy smell. Based on the information responses from database 630, a natural language response to the user input 610 may be generated and provided to the user (e.g., "Store X has one rosy smelling shampoo available."). Additionally or alternatively, the trained language model may continue with tasks associated with the original request associated with the user input—i.e., to buy rosy smelling shampoo. For example, the trained language model may generate, based on the response to the information request made to database 630, a purchase request or a request to add 1 unit of the rose smelling shampoo to the shopping care. The purchase request (e.g., a form of an information request) may be routed to a second database 635 associated with placing an order to a supplier. The purchase request may result in 1 unit of the selected shampoo being added to shopping cart 650. Based on information received from database 635 (e.g., a confirmation of the addition to the shopping cart, a full representation of the shopping cart, etc.), a corresponding output may be generated for the user (e.g., a representation of shopping cart list 650 may be generated to the user) as indication of successful execution of the original request to buy rosy smelling shampoo.

As shown by the FIG. 6 example, the disclosed systems may enable a user to input to the system complex natural language questions or commands that may require access to one or several databases to answer or complete. The system may also update one or more databases in response to the free language user input. In the example shown in FIG. 6, store inventory 640 may automatically be adjusted based on the purchase of the rosy shampoo item (e.g., the quantity of the rosy shampoo line item reflected in inventory 640 may be decreased by one unit). In addition to information being retrieved from database 630 (e.g., whether the store sells rosy smelling shampoo and/or whether that product is in stock), a database update command may be directed to database 630 based on the requested purchase of the item. For example, the system may include a request to decrease the inventory of rosy shampoo by one unit if the user input requested a purchase of one unit, or at least did not specify a purchase of more than one unit. Of course other commands may be conveyed by the user input. For example, a user input may state, "Buy rosy smelling shampoo if it's less than $10." In the example of FIG. 6, the trained language model may generate one or more information requests to ascertain first whether the store sells rose smelling shampoo, next whether rose smelling shampoo is currently in stock, and also whether the unit price of available rose smelling shampoo is less than $10. Based on the responses to these database information requests, in the example of FIG. 6, the trained language model may generate an output such as: "the store has available one type of rose smelling shampoo, but it sells for $12 so has not been added to the shopping cart." In response, the user may issue another request, such as "buy the rose smelling shampoo." The trained language model, in this case, may leverage information already requested and received from the relevant database 630 (e.g., information that may be stored in one or more buffers or other types of memory units) to take the next steps: e.g., decrementing the store inventory by one unit of rose smelling shampoo and adding an identifier of the rose smelling shampoo to shopping cart 650 based on a request generated to database 635.

Figure 7:
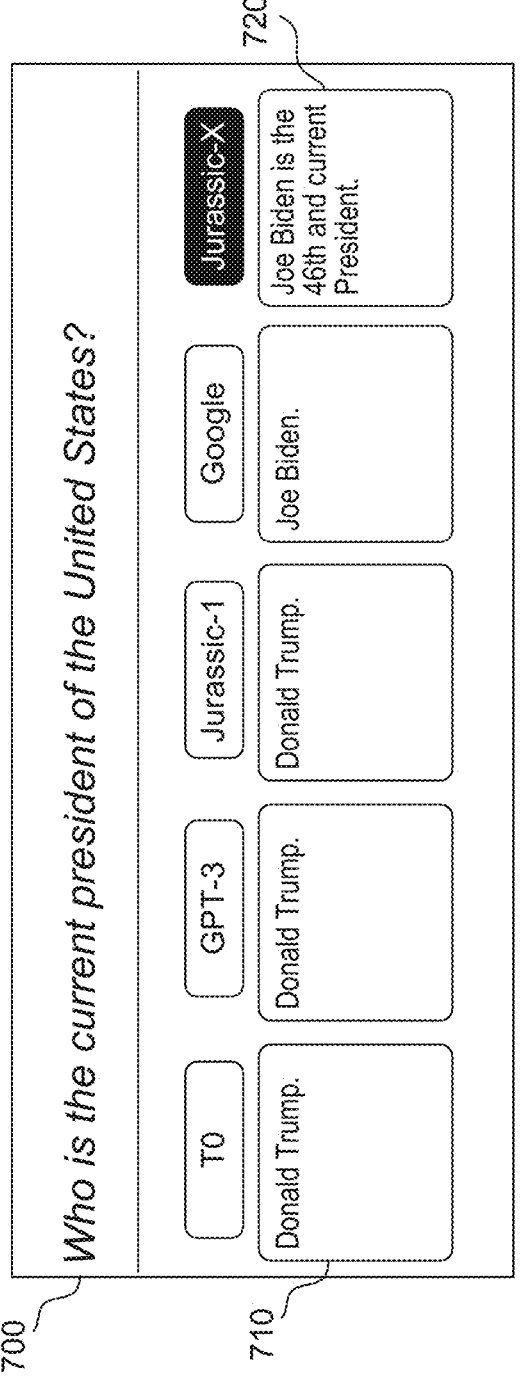
FIG. 7 shows answers from different natural language systems to a user input that requires current affairs information to respond.

Another feature of the disclosed systems is the ability to generate responses to user inputs that implicate dynamically changing information and/or current affairs information. Such operation may be challenging or impossible by systems that rely solely on static trained language models whose training was completed before the information requested was generated. For example, while trained language models may possess vast amounts of knowledge/information (historic dates, world leaders, artist names and famous works, geographic place names and facts, and more) this knowledge is reflective of the world as it was when the language model was trained. Inquiries that go beyond this training experience (e.g., requests for a weather forecast or for the name of a newly elected leader) can result in non-sensical results from typical trained language models. In the example of FIG. 7, several systems were provided user input 700 asking, "Who is the current president of the United States?" System TO provided output 710 with a response that Donald Trump is the current president. Other systems, including GPT-3 and Jurassic-1, provided the same incorrect result. Note, these responses were provided more than a year after Joe Biden was sworn into office. Google provided a correct response of Joe Biden. Jurassic-X provided a natural language output 720 indicating not only that Joe Biden is the current president, but also that Joe Biden is the 46$^{th}$ president—a fact that allows the user to confirm that the "current president" referred to in the response is a valid response applicable to the time the user request was generated.

In the example of FIG. 7 and based on the techniques described above, in order to generate a response to the user, the trained language model of Jurassic-X decomposes the user input into one or more information requests (e.g., what is the current date, how many US presidents (X) have served as of the current date, what is the name of the Xth president of the US). These information requests may be routed to one or more information resources, and a natural language output 720 may be constructed based on the information retrieved in response to the requests from the trained language model.

As another example, the disclosed systems may receive a natural language question associated with current affairs information. For example, a user may enter "what are the results of the election held in Australia yesterday". The trained language model may decompose this request into a request to a news source for "results of the election held in Australia" and a second request to a calendar model to determine what date corresponds to "yesterday". Wikidata API may be used to access Wikidata to find a page including up to date or recent election results from Australia. It is to be appreciated that the format of the request to the website may be converted from natural language to an input format understood or required by the website (i.e., using the API to make a call (i.e., interface) with the website). The natural language system may receive a response from the website including the current affairs information response. The trained language model may also receive a response from the calendar model indicating the date associated with "yesterday." This date information may be used either in formatting the information request to Wikidata or in verifying the returned Wikidata results correspond to the correct date. Based on the information received from the knowledge experts, the trained language model may generated a natural language response to the user input.

Figure 8A:
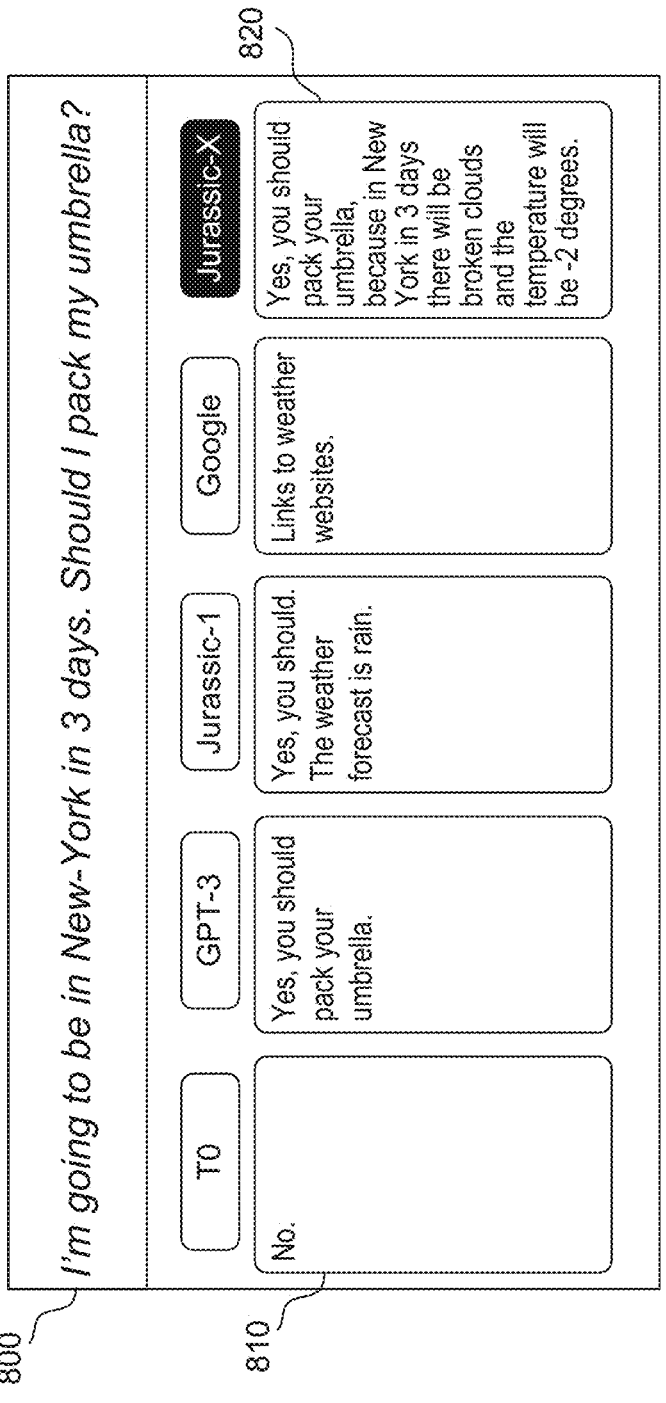
FIGS. 8A and 8B shows answers from different natural language systems to a user input that requires dynamically changing information to respond accurately.
Figure 8B:
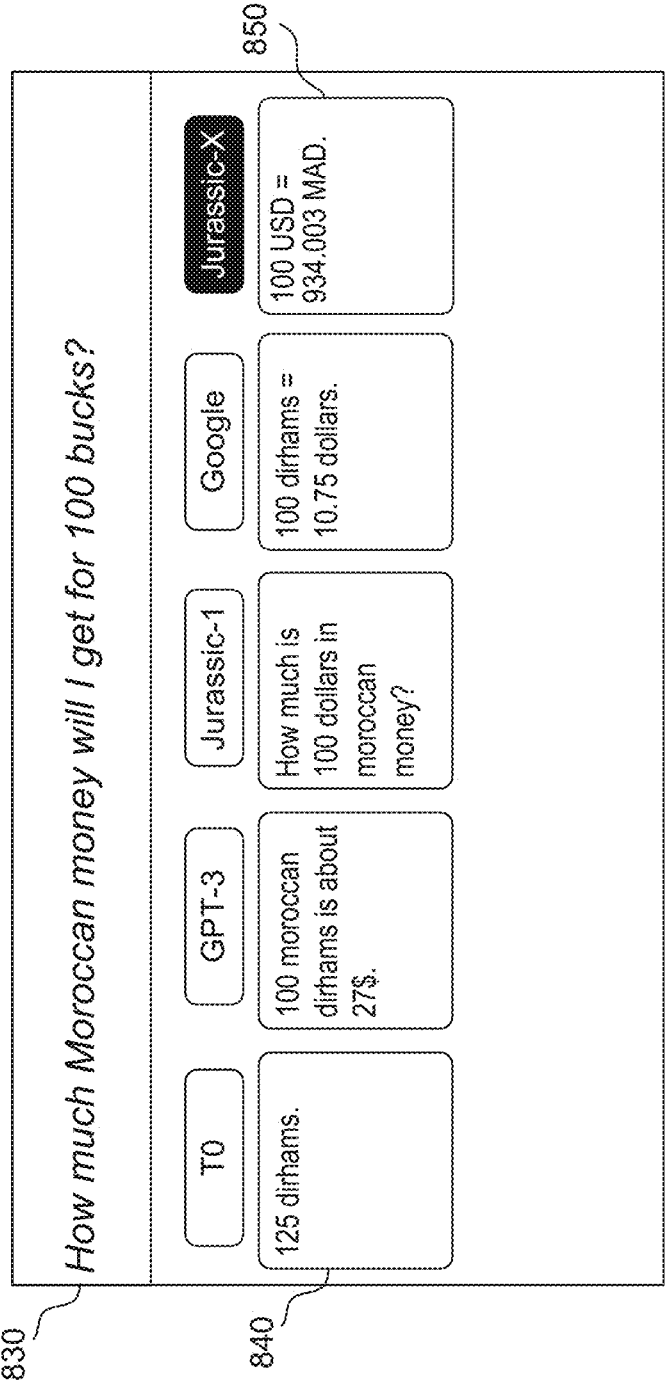

Similar approaches may be taken relative to user input associated with other types of dynamically changing information (e.g., weather forecast information, as represented by the FIG. 8A example and currency exchange rate information, as represented by the FIG. 8B example). For example, as shown in FIG. 8A, an ambiguously phrased question 800 about the weather may elicit an incorrect, inaccurate or ambiguous answers 810 from prior language models shown, regardless of when the question was asked. Jurassic-X, using the trained language model and decomposition/expert resource approach described above, provides an answer 820 based on a current weather prediction in a specific location of interest. Jurassic-X determined that the user input was seeking weather forecast information (specifically, whether a chance of rain was in the forecast as indicated by the phrase "should I pack my umbrella"). Jurassic-X additionally determined that the requested forecast was for a specific time (three days from now) and for a specific place (New York). In response to the input, Jurassic-X decomposed the input into requests to one or more information resources (e.g., a calendar to determine today's date and the date corresponding to three days from now; a weather website including a forecast for New York City). In response to the information received, the trained language model of Jurassic-X generated the natural language response, "Yes, you should pack your umbrella, because in New York in 3 days there will be broken clouds and the temperature will be –2 degrees."

As shown in FIG. 8B, a natural language question 830 asks "How much Moroccan money will I get for 100 bucks." As shown, other systems provide incorrect information 840 or information that does not answer the question asked. The trained language model of Jurassic-X, however, understood that "bucks" refers to USD and decomposed the user input into information requests such as: "what is the current exchange rate from USD to MAD?" (or 1 USD=X MAD); and a calculator request such as "0.934003×100="). Using the results from the knowledge experts/applications, the trained language model of Jurassic-X provided a correct answer 850 indicating not only that the answer to the question is 934.003 MAD, but also that that is how many Moroccan Dirhams will be received in exchange for 100 US Dollars.

FIG. 9 represents another example of a natural language input requiring multiple steps for generating an accurate response. As shown, the user has entered a composite question 900 "Do more people live in Tel Aviv or in Berlin?" First, the question "What is the population of Tel-Aviv?" needs to be answered. Second, the question "What is the population of Berlin?" needs to be answered. Finally, the sub-part from the natural language question of "Do more people live in?" needs to be evaluated as "Which city is larger?" or "Which city has a greater number of residents?". This is a highly non-trivial process for a language model, and language models may fail to answer this question accurately. As shown in FIG. 9, responses 910 from language models without external knowledge sources provide inaccurate or incomplete answers. Moreover, the user may not know the process leading to the answers, hence is unable to trust them. Using the disclosed trained language model and techniques, Jurassic-X can decompose such problems into basic questions, route each to the relevant expert, and generate an answer in free language to display to the user. As shown in FIG. 9, the Jurassic-X response 920 is accurate and complete. Importantly, Jurassic-X not only provides the correct answer but also displays the steps 930 taken to reach it, increasing user trust in the system.

Transparency and trust are critical elements that are lacking in language models, preventing a much wider adoption of these models. This lack of transparency is demonstrated in FIG. 10 by showing answers from several prior natural language systems to the question 1000 "Was Clinton ever elected as president of the United States?". The answer depends on which Clinton the question is referring to, Bill or Hillary. Responses 1010 by other prior natural language systems to this ambiguous question 1000 depending on their language models may be incorrect or ambiguous as shown in FIG. 10. Response 1020 is made clear by Jurassic-X. Jurassic-X has a component designed for disambiguation in the response it provides. In other examples, Jurassic-X's transparency is demonstrated including displaying the steps of the mathematical operations performed to generate the natural language response to the user and including displaying in a generated response the answers to simple sub-questions in embodiments where multiples steps may be needed to create a response.

The sections provide additional details regarding the capabilities of the disclosed trained language models and associated techniques. Additional information relating to training and operation of the model is also provided in the sections below.

Mega language models have ushered in a new era for AI, serving as a gateway to natural-language-based knowledge tasks. But they are also inherently limited as currently construed and used. These limitations and how they can be avoided by adopting a system approach are described herein. Conceptualizing the challenge as one that involves knowledge and reasoning in addition to linguistic processing, a flexible architecture may be defined that includes multiple neural models, complemented by discrete knowledge and reasoning modules. The architecture, called the Modular Reasoning, Knowledge and Language (MRKL, pronounced "miracle") system, is described along with some of the technical challenges in implementing it, and Jurassic-X, AI21 Labs' MRKL system implementation.

Huge Language Models (LMs) such as GPT3, T5, TO, EXT-5 and Jurassic-1 have taken AI by storm, with the promise of serving as versatile, general-purpose foundations for many applications. Indeed, partly for this reason, these LMs have been rebranded by some as "foundation models". But there is another reason to avoid the term "language model," since it can be misleading. While LMs indeed model syntax, grammar and other linguistic elements, one of their key features is that they model the world, as described by the data on which they were trained. Thus, LMs serve as a textual gateway to the universe of knowledge, and perhaps should instead be referred to as "language and knowledge" models.

Figure 11A:
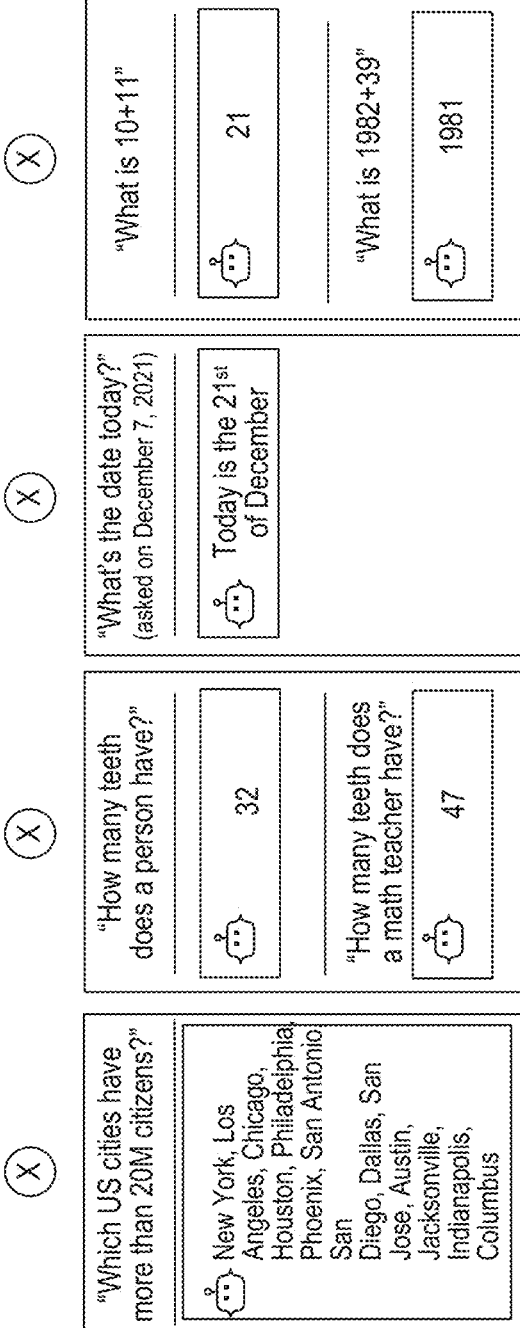

When viewed this way, it becomes clear that, despite their impressive performance, current LMs have inherent limitations. Although indeed versatile and impressive, the performance of even huge LMs is limited in many cases, and many inputs in natural language receive incorrect—and often ridiculous—answers. FIG. 11A provides a sample output of GPT-3 on simple queries. (To be clear, this is not a critique of GPT-3 specifically, and other LMs—including the Jurassic-1 system exhibit similar inaccurate outputs).

In other words, LMs do not realize that there are no US cities with more than 20 m citizens or that a math teacher is a person, do not know what today's date is, nor can they engage in even simple (e.g., mathematical) reasoning. The root cause of the core limitations of LMs is that they do not have access to all required knowledge, and neural models are ill-suited for certain types of calculation.

For example, they may lack access to current information. Certain data constantly changes—the exchange rate between the dollar and the Moroccan dirham, current COVID numbers, the stock price of AAPL, the weather in Vancouver, or today's date (among many other categories and types of information). It's impossible, by their design, for pretrained language models to keep up with this dynamic information.

Additionally, they may lack access to proprietary information sources. For example, the models do not have access to proprietary company information, such as the client roster in a company's database, or the state of an online game.

Also, they may lack reasoning abilities. Certain reasoning is beyond the reach of the neural approach and requires a dedicated reasoning process. As described above, one classic example is arithmetic reasoning. GPT-3 and Jurassic-1 perform well on 2-digit addition, which is impressive, but confidently spit out non-sensical answers on 4-digit addition. With increased training time, better data and larger models, the performance will improve, but will not reach the robustness of an HP calculator from the 1970s. And mathematical reasoning is just one example of many.

In addition to these shortcomings, another inherent problem with the traditional approach to deploying LMs is model explosion. Current LM zero-shot performance trails that of fine-tuned models. LMs can be fine-tuned to a specific task, but then lose versatility. Contemporary efforts to mitigate the problem focus on training a huge LM jointly on many sets of curated NLP tasks in a massive multi-task setting (several leading studies reaching 100+ tasks). These formidable efforts are effective showing that the resulting models exhibit versatility and high performance when encountering inputs resembling those of the curated tasks. But the performance of these models on tasks that are not close enough to those included in the curated tasks can significantly deteriorate (for example, perplexity degrades significantly).

There are two potential solutions, neither of which is practical. First, one could keep multiple, fine-tuned models for different uses. If it is possible to maintain small, specialized models that solution may be practical. But training and serving multiple mega-models is not. Second, alternatively, it may be possible to avoid model explosion by adding new tasks through fine-tuning the previously multi-task-trained LM. However, there is no guarantee that performance on the original tasks will be retained, so the model needs to be retrained on all tasks together. Given the cost of training such models, it is infeasible to perform retraining of the model often.

Figure 11B:
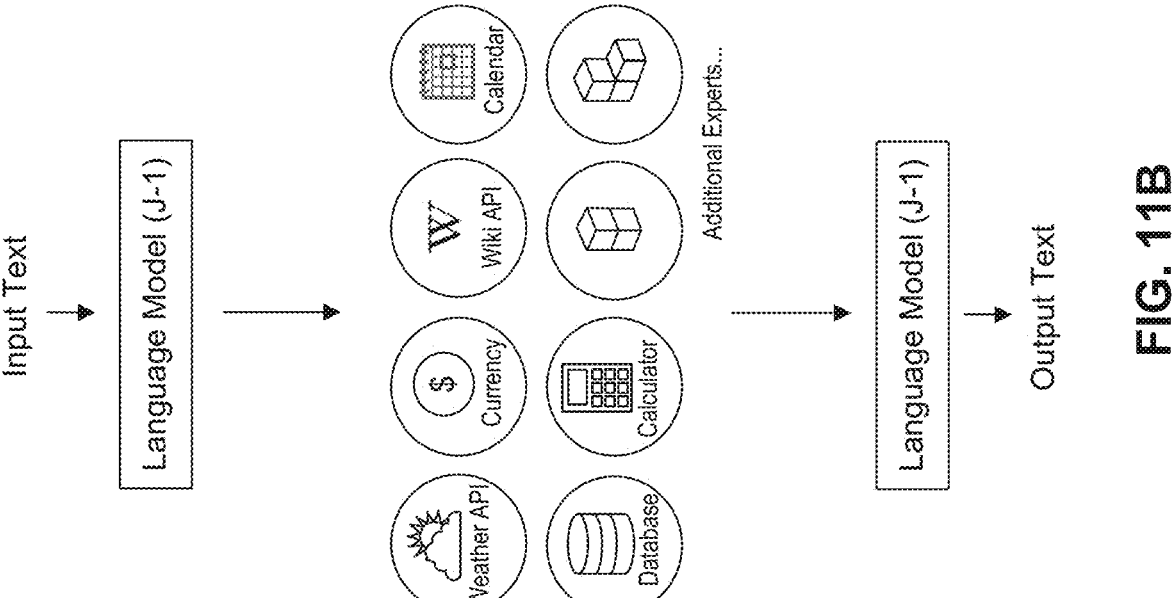

Despite all these shortcomings, large language models are an essential backbone of any future AI system. The question is how to gain the benefits of self-supervised deep language models without the disadvantages. The solution offered takes the form of a flexible architecture dubbed the Modular Reasoning, Knowledge and Language (MRKL, pronounced "miracle") system, whose high-level design is depicted in FIG. 11B.

The MRKL system consists of an extendable set of modules, and a router that routes every incoming natural language input to a module that can best respond to the input (the output of that module can be the output of the MRKL system or be routed to another module). These modules can be neural, including the general-purpose mega model as well as other smaller, specialized LMs or symbolic, for example a math calculator, a currency converter or an API call to a database.

MRKL systems enjoy important benefits when compared to fine-tuned multi-task models. First, safe fallback where, in case the input does not match any existing expert module, the router sends the input directly to an LM (e.g., J1-Jumbo developed by AI21 Labs). Second, robust extensibility where, since each expert is trained independently, new capabilities can be added with low cost while guaranteeing that they do not compromise the performance of existing ones. Third, interpretability meaning that the routing decisions, and specifics of subsequent calls to discrete reasoners provide an interpretability for MRKL's output, an element that is crucially lacking in existing language models. Fourth, up-to-date information such that the integration of external APIs allows the MRKL system to connect to dynamic knowledge bases, and correctly answer inputs that static models cannot. Fifth, proprietary knowledge provides access to proprietary databases and other information sources. Finally, compositionality such that, by routing compounded multi-hop inputs to different experts, their responses can be naturally integrated and convoluted inputs can be correctly addressed. These capabilities have been implemented in a MRKL system called Jurassic-X developed by AI21 Labs.

There are many details involved in implementing a MRKL system. One particularly interesting challenge is that of smoothing the neuro-symbolic interface. In the example of arithmetic calculation, the various challenges in training discrete experts and integrating them with a language model, relevant to any MRKL system that integrates external databases or APIs are shown. A calculator is used as a familiar running example for a discrete API. A calculator requires a very specific type of input (numbers and math operators), while the goal is to enable interaction in natural language by leveraging the advantages of the language model. Achieving this goal requires handling linguistic variability at different levels. At the lexical level, one may use different synonyms that carry the same meaning: ("twelve", "12" and "a dozen"), or words with different meaning that express the same concept in an arithmetic exercise ("I lost one ball" and "I dropped one ball"). Similar meanings can also be expressed by different syntactic structures: "I lost one ball" and "One ball was taken from me". In a calculator, all these should result in subtracting one (see FIG. 11C). Moreover, in order to implement neuro-symbolic reasoning at scale, generalization over different types of operations and levels of complexity is crucial.

In some embodiments, the MRKL system is operationalized on a specific domain, namely arithmetic questions. We find that while extensive pretraining does allow Jurassic-1 to achieve reasonable performance in a few-shot setting, its performance is far from perfect. Using a data augmentation methodology, based on generating examples from a structured example space, we show that the static pretrained LM can be made to achieve near perfect performance. Our experiments demonstrate the feasibility of achieving production-level performance in a neuro-symbolic reasoning task using Jurassic-X and provide empirical results as to the generalization ability that Jurassic-X presents. We empirically investigate two related research questions: First, what is required in terms of data augmentation to achieve near-perfect performance in a particular setting and second, what generalization ability between questions of varying complexity and type Jurassic-X presents in a particular setting. A systematic approach is taken to solve these problems by using a data augmentation method, by sampling training examples from a structured example space. The model's performance is evaluated on cases where the test data is drawn from the same distribution as the training data, as well as out-of-distribution (generalization) settings such as testing a model which was trained on 1-digit addition problems, on 4-digit addition.

A small set of templates is used to generate a set of training and test examples. Each example is defined according to its value along the following dimensions. First, the numbers used in the calculation are determined, henceforth the operands. The operands may be digits (e.g., 48), numbers in word form (e.g., forty eight), special words for numbers (e.g., four dozens, a pair). Second, the number of digits in the operands is determined. We explore 1-9 digits, positive and negative numbers. Third, the words or digits that are used to describe the operands is determined. Fourth, the number of operations (e.g. "How much is number plus number plus number?") is determined. We explore one or two operations. Fifth, the type of operation is determined. Addition, subtraction, multiplication and division are evaluated. Finally, the placement of brackets (where applicable) is determined. In some examples the placement of brackets (or their absence) may change the results. All logical possibilities for the case of two operations are explored. A maximally detailed and controlled experimental setting is selected and arithmetic problems that minimize ambiguity and are derived from a few basic templates is the focus. FIG. 11C details the templates used in this set of experiments for the case of a single operation. One or two operations in each calculation are considered. Taking all combinations of operations that have a natural formulation in natural language yields 29 distinct combinations, given in FIG. 11D.

These examples are considered domain-less, as they directly describe mathematical calculations. The case of domain-specific arithmetic problems is considered, where the computation is implicit in the description of the problem. Questions from the money domain as a test case are evaluated and templates are created for covering this domain. Specifically, questions that are formed are considered by replacing the explicitly arithmetic words such as 'plus' or 'times' with domain-specific words and relations, such as 'pay', 'spend', 'earn', and the objects with monetary objects such as '5 dollars' or '2 pennies'. Questions that include money-related vocabulary and domain knowledge (e.g., a dime is 10 cents, a pound is 100 pennies) are considered.

In results for experiment 1, generalization across different number of digits in the operands are shown. Jurassic-X's ability to generalize to numbers it has not seen in the training data is tested, including numbers with a different number of digits. Simple problems are experimented with, involving only numbers (and not numbers as words) from 0 to 9, and a single operation. Two settings are explored: one where that operation is addition, and one where it is multiplication. FIG. 11E presents the results, sliced by the number of digits, and compared to the results by GPT-3's approach of treating numbers as standard tokens. The results show that despite the fact that training was only done on numbers of up to two digits, the model is able to generalize to any number of digits.

In results for experiment 2, generalization from digits to number as words and vice versa are shown. In this set of experiments, the model's ability to generalize from arithmetic questions with digits to ones worded with words is tested. For example, how well the model can extract the math equation from an input such as "How much is 15 times 12?" is explored. FIG. 11F presents the results which demonstrate that training on digits performs well for single digit operations, but not more. However, a model that was trained on words is able to solve multi-digit computations specific in words.

Huge, pretrained Language Models (LMs) have demonstrated surprisingly good zero-shot capabilities on a wide variety of tasks. This gives rise to the vision of a single, versatile model with a wide range of functionalities across disparate applications. However, current leading techniques for leveraging a static or "frozen" LM—i.e., leaving its weights untouched—still often underperform fine-tuning approaches which modify these weights in a task-dependent way. Those, in turn, suffer forgetfulness and compromise versatility, suggesting a tradeoff between performance and versatility. The main message is that current frozen-model techniques such as prompt tuning are only the tip of the iceberg, and more powerful methods for leveraging frozen LMs can do just as well as fine tuning without sacrificing the underlying model's versatility. To demonstrate this, three novel methods for leveraging frozen models are introduced, each of which vastly improves on current approaches. In some cases, the methods introduced outperform fine-tuning approaches. One of the methods surpasses a fine-tuned TO on the massive multi-task suite on which it was trained, and another improves upon the state-of-the-art in the Natural Questions benchmark for open domain question answering. The computational cost of each method is higher than that of existing frozen model methods, but still negligible relative to a single pass through a huge frozen LM. Each of these novel methods constitutes a meaningful contribution. By presenting these contributions together a broader message that goes beyond the details of any given method is formulated which is that frozen models have untapped potential, and that fine-tuning is often unnecessary.

The current preferred way to optimize performance for a given NLP task is usually to fine tune a pretrained LM. A side effect of doing so is that performance degrades significantly on other tasks. Partly in response, considerable work has been devoted to fine tuning huge LMs simultaneously on many (in some cases, over 100) curated NLP tasks. These formidable efforts have been effective in the sense that they have produced models that exhibit high performance on inputs taken from any of the curated tasks, and, indeed, from other similar tasks.

However, fine tuning the LM, even in the above "massively multi-tasked" settings, limits the versatility and extensibility of the resulting model. Versatile natural language interfaces can be built on top of frozen LMs. This approach offers two key advantages over multi-task fine-tuned models. First, non-forgetfulness such that once the original LM is fine-tuned on any multi-task suite, it can suffer from catastrophic forgetfulness on capabilities far enough from these tasks (as shown, for example, in perplexity degradation). A frozen LM may not suffer forgetfulness, since it remains unchanged. Second, extensibility such that when attempting to add a new task to a fine-tuned LM, there is no guarantee that performance on the original task suite will be retained, so the model must be retrained on all tasks together. Given the cost of training such models—in some cases, millions of dollars—it is clearly infeasible to do so repeatedly. In contrast, when adding new capabilities as new external components over a frozen backbone, there is no cross interference between capabilities.

These compelling advantages are known. All of these methods share the idea of training a very small number of parameters around a frozen model to achieve optimized performance on given tasks. However, while these techniques are able to reach fine-tuning performance for certain tasks, state-of-the-art performance in many practical settings still requires fine-tuned models. To demonstrate that frozen LMs still have considerable untapped potential, the general approach is to design more ambitious external scaffolding that can squeeze more out of a frozen LM. The key observation is that existing frozen LM methods are so compact that there is room to expand them significantly while still paying a negligible price relative to the single pass through the huge LM. The focus is on two settings in which the go-to standard is still fine-tuned models. The first, as discussed above, is massive multi-tasking which is asking a single model simultaneously to address many NLP tasks. Frozen model methods have not shown competitive performance in this setting. The second setting is a challenging individual task, on which existing frozen model methods are not competitive, for example, in open-domain question answering, asking the model to answer general knowledge questions. Open domain question answering has two popular variants, "open book", in which the model is given access to documents retrieved from a predefined corpus (web, books, proprietary corpora) that are likely to contain the information relevant to a given input, and "closed book", in which the model is trained to reply to the input query with no auxiliary information. Existing frozen model methods vastly underperform fine tuning in both of these settings. Even in challenging settings such as massive multi-tasking or open-domain question answering (in either its open- or closed-book variants), state-of-the-art performance can be achieved by leveraging a single huge, frozen LM. Indeed, the results described herein show that current frozen-model techniques vastly underutilize frozen LMs. By being more ambitious in the way such frozen LMs are leveraged, training and serving many different specialized models for different use cases can be avoided. Thus, versatility, non-forgetfulness, and extensibility can be retained, while matching or exceeding the performance of specialized fine-tuning techniques.

The following sections describe three novel methods for building powerful neural systems around frozen models: Input-dependent prompt-tuning for massively multi-tasking a frozen LM; Retrieval-augmented generation with a huge frozen LM; and Recursively applying a frozen LM. In input-dependent prompt tuning, gains by fine tuning in the multi-task domain can be achieved with a frozen LM and a much smaller trained encoder that generates an input-specific neural prompt are shown. This eliminates the need not only for expensive multi-task fine tuning, but also for hosting multiple large models. For example, rather than hosting both InstructGPT and GPT-3, a single GPT-3 model can be maintained, and a small encoder can prompt it per input to mimic the operation of the fine-tuned InstructGPT.

Retrieval-augmented generation with a huge frozen LM involves an open-book variant of the open-domain question-answering setting. The answer generator attends to 100+ retrieved documents, and is therefore called a reader. Current readers are fine tuned for this long-context functionality. Because it is prohibitively expensive to fine tune huge models to attend to 100+ retrieved documents, readers tend to be relatively small, typically having fewer than 1B parameters. Huge LMs into this pipeline as frozen readers are introduced. To do so, we reformulate the typical "retrieve!generate" flow as "retrieve!focus!generate", where the new focusing stage condenses relevant information from 100+ retrieved documents into the input sequence length of the frozen LM reader. By bringing huge LMs onto this playing field, a new standard is established for state-of-the-art performance on Natural Questions, a prominent open-domain question answering benchmark. Specifically, by leveraging frozen J1-Large-7B, J1-Grande-17B, and J1-Jumbo-178B readers we improve upon current state-of-the-art performance by 1, 2.5, and 4.5 points, respectively.

Recursively applying a frozen LM involves multiple uses of the LM. A huge LM is a powerful and highly expensive resource, but existing approaches use this resource only once per input query. A single pass through the LM extracts useful information in the closed-book variant of open-domain question answering (no retrieved documents) is performed, but that leaves considerable additional information untapped. As a result, we are able to achieve large performance gains by performing two consecutive passes through a single frozen LM, as compared to performing a single pass through the same frozen LM. We describe two ways of instantiating this broad idea, which we dub LM recursion which are neural LM recursion and textual LM recursion. This direction leads to the economically disruptive possibility of paying for better performance at evaluation time rather than at training time. That is, rather than pretraining an enormous model that must be used on all inputs, one might vary the number of passes through a single frozen model based on an assessment of the difficulty of the input.

While huge pretrained LMs often exhibit impressive zero-shot performance, the practice of massively multi-tasking an LM via fine tuning has been shown to dramatically improve performance across tasks and domains. For example, others have fine-tuned the 11B parameter T5 model on curated suites of 62 and 107 datasets, respectively, to provide two new multi-tasked models called TO and EX-T5, respectively. Others have also fine-tuned Google's internal 137B parameter vanilla LM on their curated suite of 60 datasets, producing a multi-tasked model called FLAN; fine-tuned the 770 M parameter GPT2 on a curated suite of 142 datasets; and fine-tuned the 175B parameter GPT3 on disparate datasets of human instructions. Responses from their new multi-tasked 175B parameter InstructGPT model are now commercially offered in parallel to their original GPT3 model. Below, an approach is presented called Input-Dependant Prompt-Tuning (ID-PT) for massively multi-tasking an LM while keeping it frozen. ID-PT trains a very small external network that receives an input from one of the many curated datasets and prepares a neural prompt on-the-fly that best tunes the frozen LM for addressing this input (see FIG. 1). Experiments were conducted using publicly available training sets and models. ID-PT was performed on a frozen 7B parameter J1-Large model and reached the performance of a fine-tuned 11B parameter T0++ model after training on only half of the training examples. This demonstrates that there is no real need for the previously mentioned multitude of huge fine-tuned LMs targeting the multi-task domain. One can maintain and serve a single frozen LM as a backbone and perform ID-PT to externally tune it on different task suites, or to modify a given combination of supported datasets at low cost. Moreover, as shown in later sections, this enables a new workflow in which a single huge LM is deployed to support a wide range of different NLP operations.

Figure 12A:
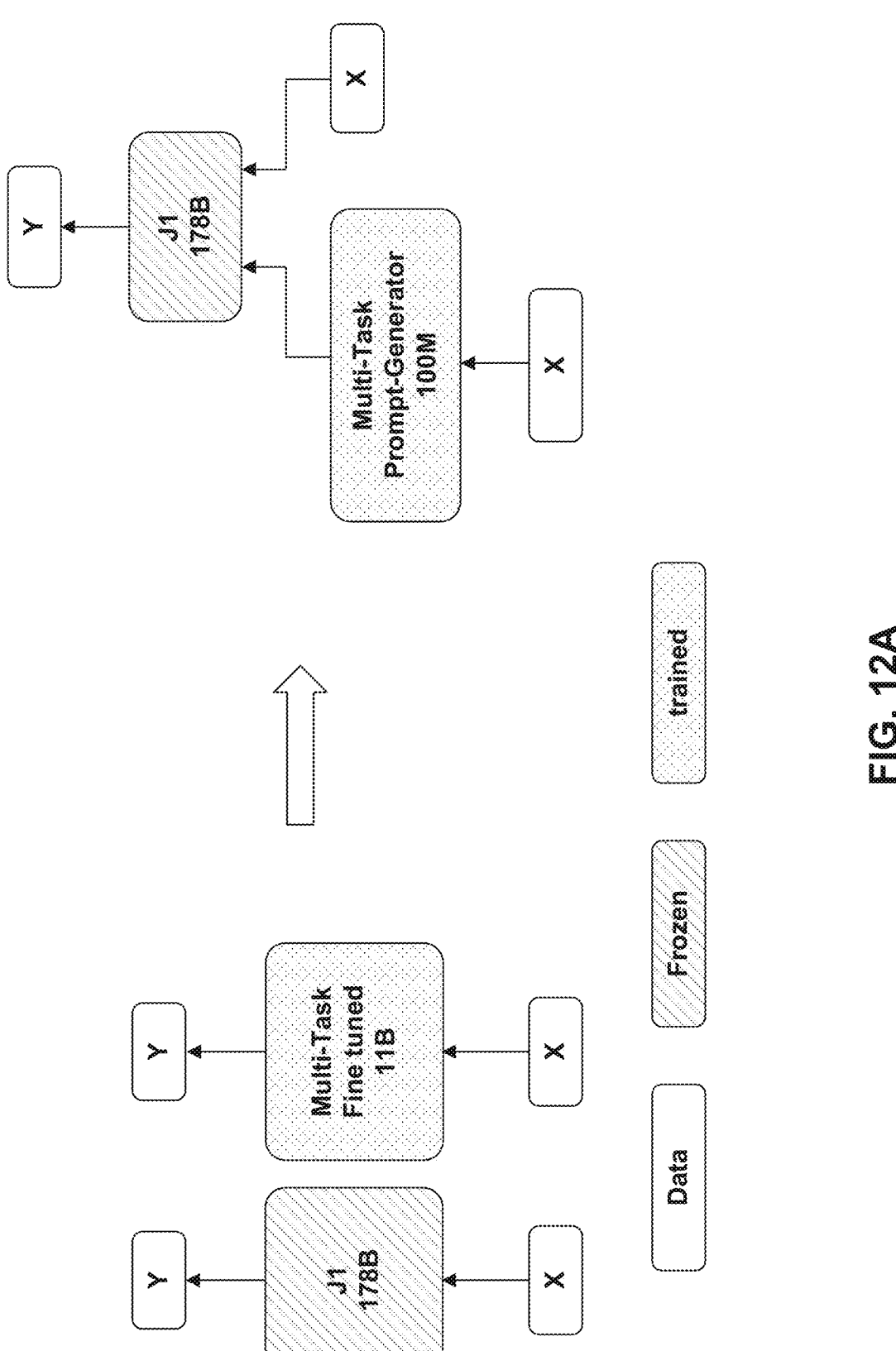

A prompt-tuning method is a simple and effective method for externally tuning a frozen model. For a given task, a fixed number of neural embeddings is optimized when concatenated to the input embeddings of each training example (illustrated in FIG. 12$a$). When trained on a single dataset (and when given access to a large-enough model), prompt tuning has been shown to yield performance competitive with fine tuning (5 refs, prompt tuning v2, etc). The fraction of parameters trained during prompt tuning is tiny relative to full model size (0.001%). However, as shown below, prompt tuning falls short of fine tuning in the multi-task domain. This may occur because the trained prompt embeddings are shared across all tasks in the diverse multi-task suite. Indeed, x and y show that the prompt embeddings learned for disparate NLP tasks are far apart in embedding space, suggesting that no single prompt embedding would perform well for a wide range of different tasks. The Input-Dependant Prompt-Tuning (ID-PT) method aims to address this potential shortcoming. It creates prompt embeddings as a function of the input, thus allowing the prompt to vary substantially across tasks. Specifically, whereas regular prompt tuning involves directly training a prompt embedding p, in ID-PT a prompt generator is trained to receive the input x and produce an input dependent prompt p(x). The prompt generation network itself must therefore have access to a good representation of natural language in order to discern between inputs representing different functionalities. The prompt generator is constructed around a small T5-base encoder, thereby leveraging language encoding abilities acquired via extensive pretraining. The expanded prompt generator architecture consists of 3 components: (1) a frozen T5-base encoder; (2) a learned prompt for prompt-tuning the frozen T5 encoder for its functionality within the prompt generator; and (3) a learned cross-attention network that translates the variable length output sequence of the T5 encoder (of length equal to the length of input x) into a fixed length prompt p(x). The cross-attention network was implemented, first producing a fixed-length output sequence by using an attention layer with a fixed number of query vectors, and then applying 2 self-attention layers over the fixed length sequence, before finally producing p(x). This prompt generator architecture illustrates and makes concrete ideas for enhancing the processing that takes place outside huge LMs. To implement vanilla prompt tuning, 1.6 M parameters were trained to externally tune our 7B parameter J1-Large model, while in contrast implementing ID-PT required training 25 M parameters in addition to leveraging a 110 M parameter frozen T5 encoder. While ID-PT is thus considerably more "heavy weight" than vanilla prompt tuning, ID-PT is still a very small increment to the frozen model, adding an additional 0.05% to the number of parameters and 1% to inference time.

P3, a publicly available multi-task suite that includes 62 NLP datasets grouped into 12 task types (a full list of these datasets appears in the appendix) was considered. For each dataset, the P3 suite includes various natural language prompt formats, referred to as templates, which represent diverse natural manners of presenting and addressing the NLP query (e.g., in the case of a natural language inference dataset, a template could be: "If {Premise} is true, is it also true that {Hypothesis}?"). TO, a model based on T5 that was fine-tuned on the P3 training set by the same authors, was also leveraged. More specifically, they released three models, called T0, T0+, and T0++, which they fine-tuned on 39, 49, and 55 of the P3 tasks, respectively. ID-PT was performed for a frozen 7B parameter J1-Large model on the released training data of T0++ and its performance compared to the released 11B parameter T0++ model. Prior training and evaluation protocols were followed. Specifically, for training, the examples from all 55 training sets into a single training set were combined and shuffled, treating any dataset with over 500 000 examples as having 500 000/NUM-TEMPLATES examples for the purposes of sampling, where NUM-TEMPLATES is the number of different natural language templates created for the dataset. Checkpoint selection was performed by choosing the checkpoint that yielded the highest score on the validation sets of the training datasets. The input and output sequences were truncated to fit into J1-Large's 2048-token context window. A batch size of 32 was used, and trained the prompt generator via the Adam optimizer ( ).

Different fixed prompt lengths at the output of the prompt generator were experimented with. This quantity reflects the capacity of the interface between the externally training prompt generator and the frozen J1-Large LM. Others have experimented with prompt lengths of up to 150 for the single task prompt-tuning setup. In this multi-tasked setting, in which the prompt space should facilitate tuning the frozen LM into a wide range of functionalities, we studied the effect of using longer prompts, considering lengths in {100, 200, 300, 400, 600}. For each prompt length, learning rates in {2.5·10-5, 5·10-5, 7.5·10-5, 1.5·10-4} were explored for runs limited to 10% of the overall T0++ training, which amounted to 125K training steps given the batch size. After performing 10% of the overall T0++ training, training was continued with the prompt length and learning rate that got the best score on the development set. Two different input independent baselines were trained to ID-PT. For evaluation, a prior technical protocol is followed, except to report the scores on all 62 tasks while they evaluated only held-out tasks. Accuracy is reported on development or test sets only in the cases of datasets for which the respective splits exist. For tasks that involve choosing the correct completion from several options (e.g., multiple choice question answering), prior techniques were followed and used rank classification to evaluate the model, in which the log likelihood of each of the target options under the fine-tuned model was computed and selected as the prediction the option having the highest log likelihood. For simplicity, length normalization was not applied to the log likelihoods of the target options. For a given dataset, the median performance is reported across all of the dataset's natural language prompt templates. The goal is to demonstrate that frozen models can be massively multi-tasked without compromising performance relative to fine tuning. However, beyond the fact that T0++ was fine-tuned on the P3 multi-task suite and that J1-Large was kept frozen and fit parameters external to it, the two models differ in several other aspects. Most importantly: (1) T0++ is a 11B parameter encoder-decoder model, while J1-Large is a 7B parameter decoder-only model; (2) T0++ is initialized from the LM-adapted T5 model of Lester et al. (2021), which was pretrained on 1.1 trillion tokens, while J1-Large was pretrained on 300 billion tokens; and (3) J1-Large has a context window of 2048 tokens maximum, which set a limit for the total number of generated prompt tokens, input tokens and output tokens that could be employed by ID-PT. In contrast, T0++ has a maximum of 1000 encoder tokens for the input and 250 decoder tokens for the output. Moreover, J1-Large has a multi-word vocabulary, and Lieber et al. (2021) show that it can cover up to 1.3× the text of word-level vocabularies for a given number of tokens. While points (1) and (2) above constitute inherent advantages for T0++, (3) somewhat disadvantages T0++ and so can be seen as a confounder in our exploration of the power of frozen LMs versus fine tuning. To make the comparison as fair as possible, training examples that did not fit into the context of T0++ (there were few of these) were discarded. During decoding, the maximum decode length of T0++ was set at 128, as in Sanh et al. (2021), while setting it to 100, roughly 1.3× less, for J1-Large, to reflect the difference in vocabularies between the models.

Figure 12B:
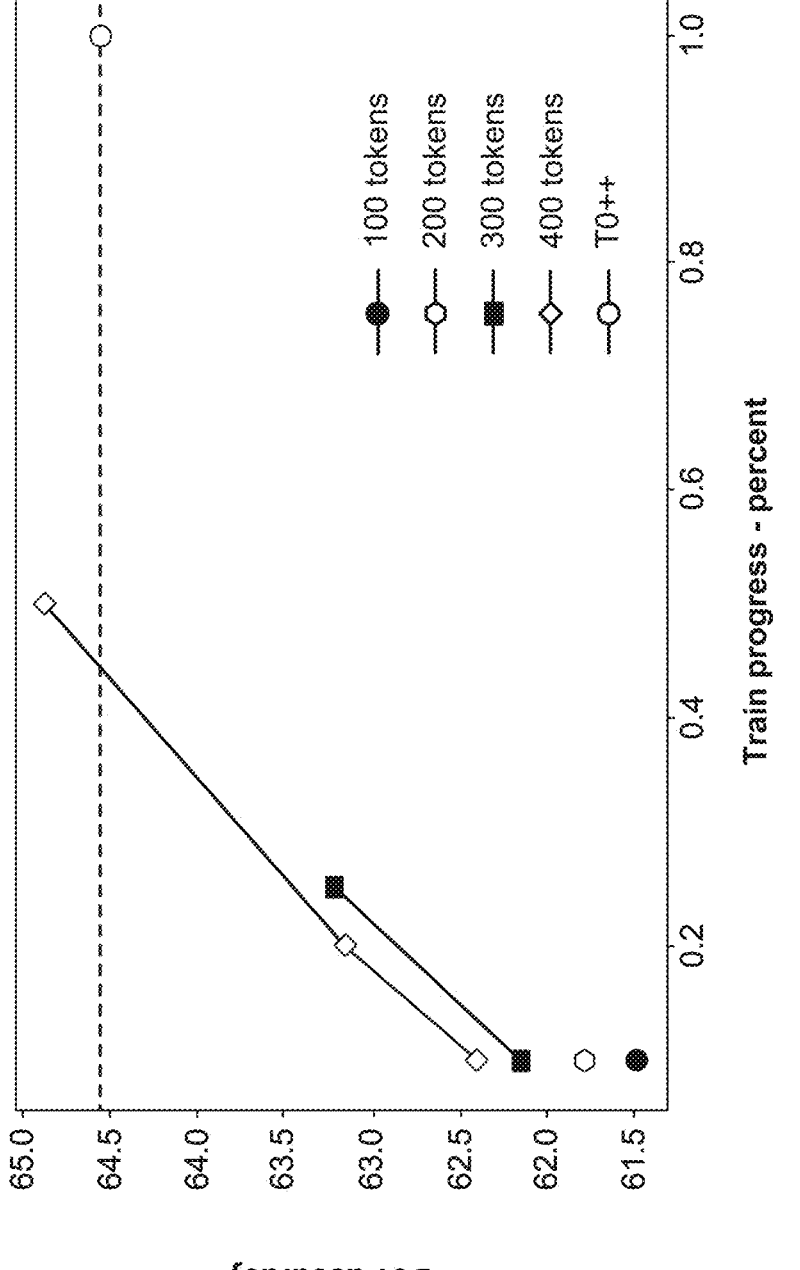
Figure 12C:
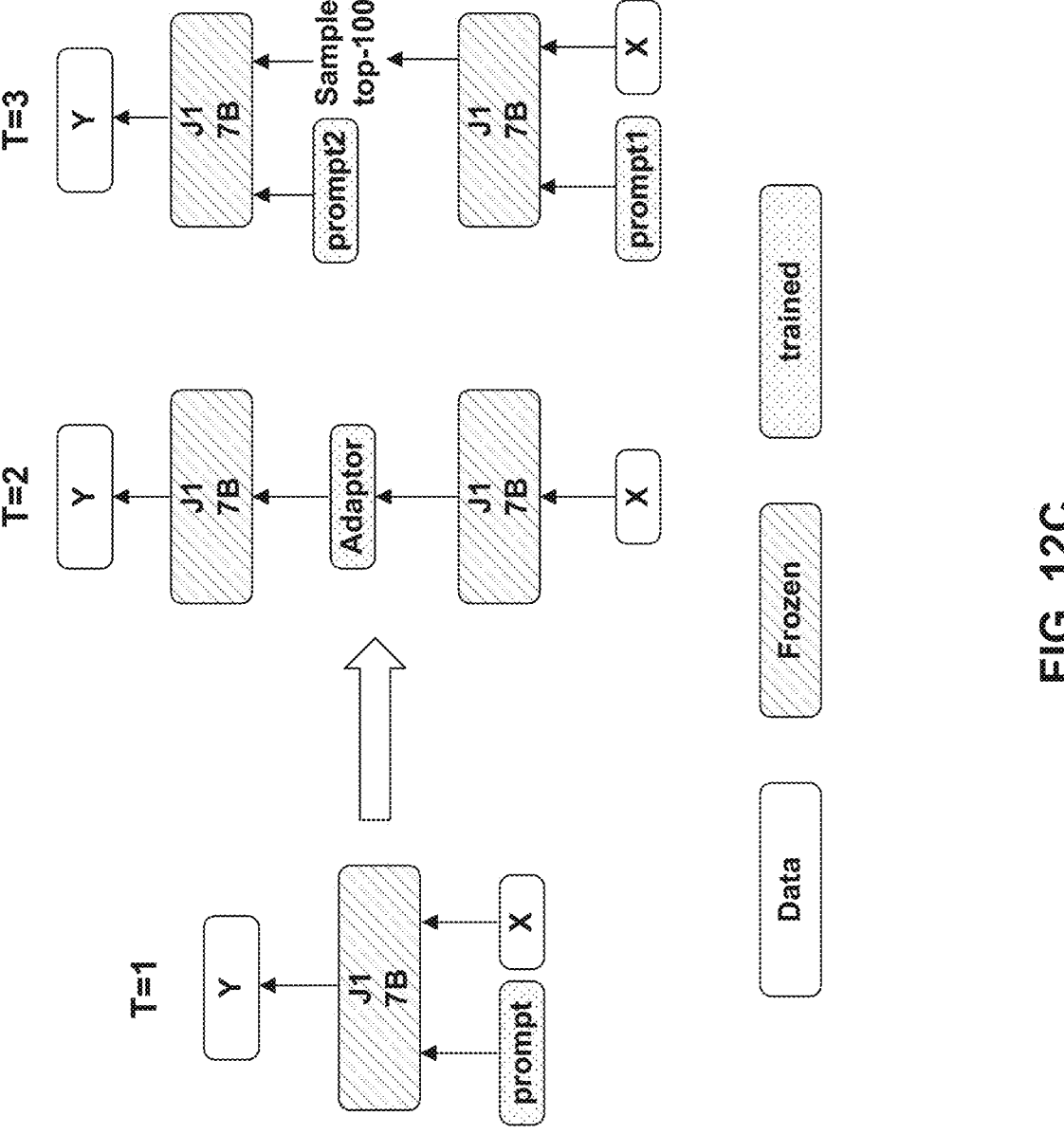

FIG. 12B shows that ID-PT+J1-Large slightly surpasses the performance of T0++ on the test set. FIG. 12B also shows the average development set scores we observed for ID-PT+J1-Large as training progressed. The prompt length experiment at 10% of T0++ training shows that longer than usual prompt lengths are indeed useful in this multi-tasked setting. There were diminishing returns beyond 400 prompt tokens, so training was continued with the 400 prompt tokens variant, which reached the average development set score of T0++ after training on roughly 50% of its training data. FIG. 12B also shows both of the input-independent prompt tuning baselines: vanilla prompt tuning and no-input prompt generator. Both baselines vastly underperform in this multi-tasked setting, demonstrating the need for input dependence in our ID-PT method for multi-tasking frozen LMs. The breakdown of development set scores by cluster and task is given in the appendix. For further insight into the input dependence of ID-PT, the average distance between generated prompt tokens of different input examples was measured. While the average normalized distance between generated prompt embeddings of two examples from the same natural language templates of the same dataset was around 0.03, this distance increases to around 0.07 for different natural language templates of the same dataset and then to 0.17 for inputs corresponding to different datasets. This shows that our prompt generator has learned to produce dataset dependent prompts. Moreover, our observation of large distances between the prompts generated for different datasets helps to shed light on the weaker performance of input-independent methods, which have no alternative to sharing the same prompt tokens across all datasets. Lastly, the fact that ID-PT still generated somewhat variable prompts for examples within each dataset hints that the method may have the ability to offer gains even in the single-task regime.

The dominant approach for performing open-domain question answering is the retrieve-and-read framework, also referred to as open book question answering. Given a question, such systems first employ a retriever over large corporations (e.g. Wikipedia) to fetch a small set of relevant documents. A reader is then used to answer the question given these documents. Due to the computational difficulty of reading many documents with large language models, such readers are usually fine-tuned small3 language models with specialized architectures. Thus, combining the power of strong supervised retrievers with that of huge language models remains under-investigated. One inherent drawback is that small retrieval augmented readers do not enjoy the world knowledge or deduction capabilities of huge LMs. On the other hand, it would be prohibitively expensive to fine-tune a huge LM to attend to 100+ documents. A solution to this problem is offered in the form of a small, focused retrieval module, which intakes the retrieved documents and outputs a smaller amount of text, short enough to exactly fit into a huge frozen LM's original context window. Ideally, the focusing module retains the pertinent retrieved information for answering the question during its decimation operation, discarding irrelevant information. Indeed, such redundancy can be found even in gold passages. The ability to ignore this information differentiates our focusing mechanism from standard re-rankers. By training a smart focuser, it is shown that a huge frozen LM can serve as an excellent reader in the setting of open book question answering and set the state of the art on the (open) Natural Questions benchmark with a frozen J1-XtraLarge/Jumbo. The Focuser module gets a question q and a set of passages Pq as inputs and returns a single context that represents the prompt for the language model. In that, it shares a similar API to the reader, which also gets a question and set of documents, and returns an answer after aggregating over P. The extractive assumption (i.e., the answer appears as a contiguous span in the corpus) commonly made in ODQA is followed and define the Focuser to be extractive as well.

Since the primary concern spans from Pq, the standard architecture of a DPR reader is used as a Focuser. However, there are three main differences between an extractive Reader and an extractive Focuser. First, a reader predicts short answer spans, while a Focuser predicts longer focusing spans, to be used later by a stronger huge LM-based reader. The supervision given to trained the two modules adheres to these properties. Second, there is usually direct supervision for training the reader (i.e., the answer span), there is not such supervision for the Focuser, as it is not known in advance how much of the context is needed to properly answer the question. Instead, we heuristically consider the surrounding context of the answer as the focusing signal for training. Third, the final output of the reader is a single span, while the Focuser's output consists of multiple spans—as many as can fit into a single context.

Formally, given q and a passage p 2 Pq, the Focuser utilizes a span selection layer over the output embeddings of BERT. Specifically, let E=BERT (q, p) be the output embeddings of BERT when applied on the concatenation of q and p. E is multiplied by two vectors ws to find the start and end scores (respectively) of each token in p. In addition, the embedding corresponding to the [CLS] token is multiplied by a third vector wg to get a global relevance score for the passage p.

For Focusing Span Aggregation, to utilize the entire context length of a given LM, we concatenate multiple focusing spans from our retrieved set Pq. For each passage p 2 Pq, the top-k spans according to f are taken. The spans from all passages (overall k·|Pq| spans) are concatenated and are sorted by their scores. Last, spans are added to the context (along with their titles) until it is of full length. If it is identified that a new span overlaps with a previous one, they are merged into a longer span.

Existing applications of transformer based LMs run a given input through the LM only once. While this is a natural choice, made in most other deep neural network applications, an opportunity to diverge from this design pattern is identified in the case of LMs. Since both the input and output spaces of an LM are in natural language, and since the same LM can serve a multitude of functionalities, it makes sense in principle to re-apply an LM to its own output, which is called LM recursion. In this section two distinct methods are presented for putting this idea into practice (see FIG. 12C) and give experimental evidence that each of them can produce significant gains. A neural approach is presented, in which a small trainable network maps the neural output representation of the frozen LM to a neural input for the next iteration through the same frozen LM. Further, a textual approach is presented, in which output text is sampled after the first pass through the frozen LM and reinserted into the same frozen LM. LM recursion is evaluated in the setting of open domain question answering, focusing on the Natural Questions benchmark, an extensive dataset of over 300,000 anonymized queries that were issued by real users to the Google search engine. Experiments were done with the 7B parameter LM J1-Large and it was shown that by iterating twice through the model both methods yield gains of roughly 20% relative to leading frozen model methods that leverage the same frozen model only once. Notably, by iterating twice through our 7B parameter model, neural recursive LMs approach the performance of a single pass through our 17B parameter LM, J1-Grande. These approaches are exciting because the prospect of improving performance by recursively applying an LM to its own output has the potential to be a game changer in the economics of serving LMs. Given an LM with unsatisfactory performance on a certain task, an existing performance improvement vertical is to pretrain an even larger LM. However, pretraining larger and larger LMs quickly becomes prohibitively expensive, and huge models are expensive to deploy even at evaluation time. Moreover, the need for improved performance may only arise in certain tasks or for certain inputs within a task. Improvement by re-applying the existing LM over its own output allows paying double the cost of a single forward pass and getting double the compute only when needed, a more focused and much cheaper option than pretraining and deploying a model of double the size.

The first approach to LM recursion is to train a Connector network that connects the output of the first pass through the frozen LM with the input of its second pass. Specifically, the inputs to the Connector network are the output embeddings after the first LM pass (before translation into the token vocabulary space), and the outputs of the Connector network are injected into the first Transformer layer of the second LM pass (bypassing the encoder). The Connector was implemented as an autoregressive network composed of a small number of unidirectional Transformer layers, the same building blocks comprising the frozen LM. Therefore, by "stitching together" two replicas of the frozen LM via such a Connector network, one gets an LM-Connector-LM network, which is essentially a deeper (mostly frozen) Transformer architecture.

Ablations were performed to investigate two key design dimensions: (1) the number of Transformer layers in the Connector network and (2) their initialization. In (1), one wants the Connector size to be a small fraction of the frozen LM's size, so it was trained 1- and 2-layered Connectors of sizes ⅟32 and ⅟16 of the 32-layered J1-Large LM. In (2), random initialization of the Connector network was compared to initializing it by pretraining the entire LM-Connector-LM stack on the self-supervised language modeling task. This was achieved by keeping both LMs frozen but passed gradients through the frozen LM to optimize the Connector's parameters. This optimization procedure gave access to up to 3% of the pretraining corpus used to train J1-Large. For baselines, while using a small Connector network guarantees a small number of parameters to train, running the large LM twice means doubling both execution cost and latency at inference time. In order to determine whether this second pass through the frozen LM leads to performance gains, prompt-tuning Lester et al. (2021) was primarily compared to. As described earlier, this is a leading frozen model method that has been shown to reach fine tuning performance on many tasks. Like all other existing methods, it makes only a single pass through the frozen LM. One might object that the Connector introduces a nontrivial number of learned parameters, which could affect performance even if the second pass through the frozen LM is unhelpful. To assess the extent to which this may be true, two additional single-LM-pass baselines, Connector-LM and LM-Connector, were run, consisting of a Connector that runs either before or after a single pass through the LM, respectively. For training details, the Natural Questions training set was trained on for 10K steps with batch size 32. The ADAM optimizer was used with X, Y, Z. For Connector training, learning rates were tried in {1·10-5, 3·10-5, 1·10-4, 3·10-4} with 0.5% warmup and linear decay. For prompt-tuning training we try learning rates in {3·10-2, 1·10-1, 3·10-1, 5·10-1} with 0.5% warmup and no decay (Lester et al. (2021) introduce the method without learning rate decay; by initial experimentation we indeed found decay unnecessary). This allows running prompt tuning with a fixed learning rate until convergence. It converges after about 100K training steps. The best neural recurrent LM architecture is trained for this number of steps, to demonstrate the added gains of performing LM recursion over a converged single-pass frozen model approach.

Figure 12E:
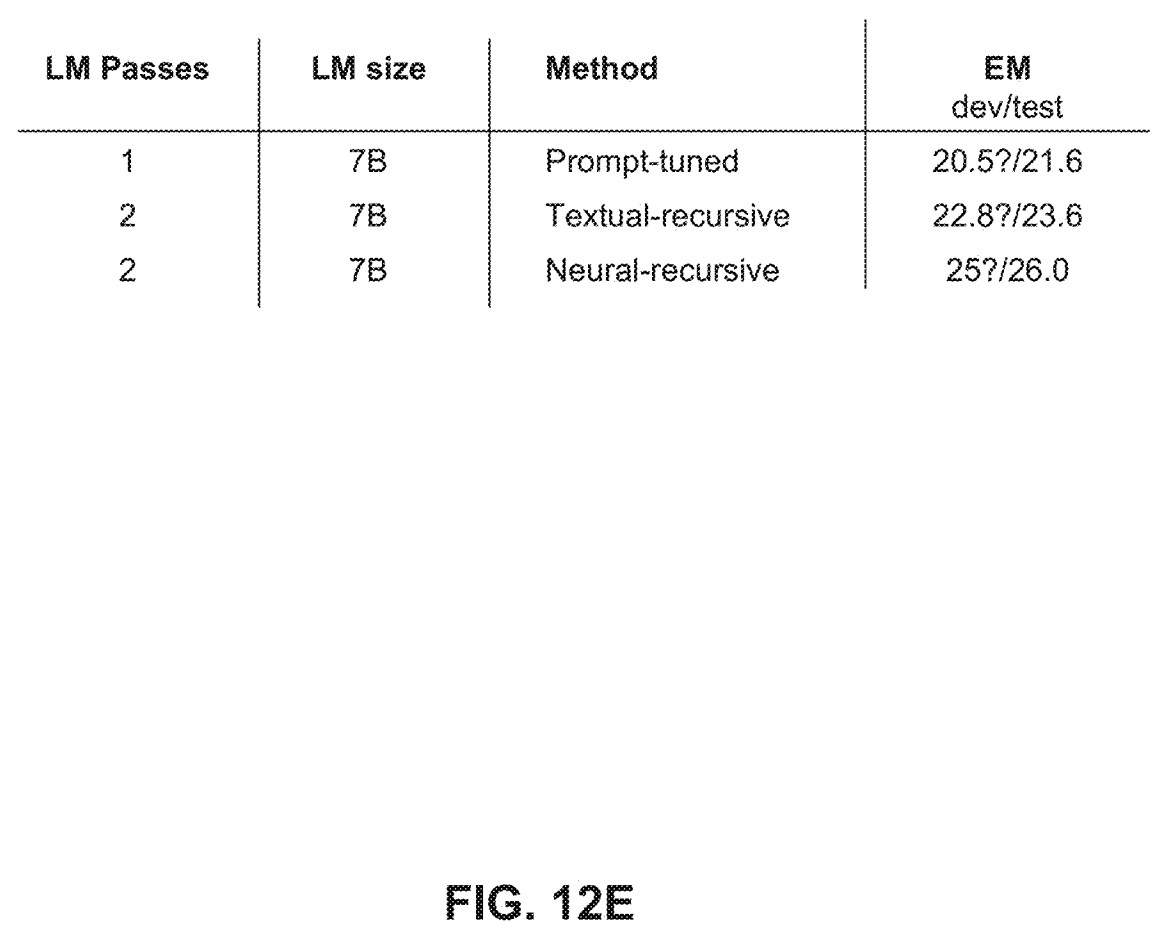

FIG. 12D contains the development set scores for the above ablations and baselines of neural recurrent LMs. Overall, clear gains of LM recursion are evident, with 2.2-3.7 point gains over single pass baselines. The strongest single-pass baseline is the Connector-LM variant, which can be viewed as prompt-tuning on steroids, as it trains more parameters than prompt-tuning at the input to the LM and improves over prompt tuning by 1.5 points. LM-Connector-LM trains the same number of parameters and improves by 2.2 points by utilizing the second pass through the frozen LM. Importantly, performing a double pass through the 7B-parameter J1-Large model closes roughly ¾ of the 5 point gap between the prompt-tuned 7B-parameter J1-Large model and the prompt-tuned 17B-parameter J1-Grande model, hinting at the potential of this method to serve as an alternative to pretraining and using larger models. In terms of ablations, initializing the Connector via pretraining the recursive LM on the language modeling task seems vital to its fine-tuning performance. Doing the same for the prompt tuning baseline does not seem to similarly help. Using a 2-layered Connector network is better than using a 1-layered Connector network (perhaps due to the expressive weakness of a single Transformer layer). Deeper Connector networks were not tried in order to keep the number of trained parameters small. Training was continued on the best recursive LM variant (pretrained, 2-layered Connector) for 10× longer, to the point where the prompt tuning baseline converged, and a comparison can be made versus a leading single-pass frozen model method that exhausted its potential. FIG. 12E shows the scores of our recursive LM and prompt tuning on the Natural Questions test set-another pass through the frozen LM improves the score by 4.4 points. In the following, a different form of LM recursion is described, performed via text. By comparing performance of the two LM recursion methods on different data splits, some light is shed on a qualitative advantage of neural recursive LMs in punching above the LM's weight class and answering challenging questions.

An alternative to the above approach of having the two frozen LM versions interact via the internal embedding space is to have them interact via text. One possible way of doing this was implemented, which involves decoding many answers after the first pass through the LM, and then reinserting them into the LM for a second refining pass. In contrast to existing re-ranking approaches, which train external re-ranking modules to pick the correct answer out of several generated candidates, here the frozen LM is used for "re-ranking" itself. This approach can also be contrasted with the retrieval-based approach presented previously, where the first pass "retrieves" several candidate answers from within the model itself, rather than from an external corpus. Both views raise the question of whether such a form of LM recursion can improve performance. As shown below that it does and comment on potential roots of this success. Relative to neural recursive LMs, this approach involves less trained parameters and can provide textual insight on the intermediate stage between frozen LM operations. On the downside, the gains are smaller than in neural recursive LMs, which have direct access to the model's internal representation space. Moreover, the operation of sampling slows down the inference process; running twice through the model is done is more efficiently in neural recursive LMs.

First, the LM is prompt-tuned on the question answering task, and then sample candidate answers from it. Then, the LM is prompt-tuned again, this time on the task of producing an answer when given the question along with the candidate answers sampled from the first pass through the LM. For the first stage, the prompt-tuned model was used from the previous example that was trained until convergence and sampled n candidate answers from it via decoding at temperature 1. When sampling n≫1 candidates, there is a better chance to sample the correct answer than in the common case of attempting to provide a single answer via greedy decoding. The recall at n for questions in the development set of Natural Questions, for n in {1, 8, 16, 64}, which reaches 44% for n=64. However, leveraging this enhanced recall during the second prompt-tuning stage is not trivial, on two accounts: 1) while the recall grows with n, so does the number of confounders 2) the same model is used to re-rank itself, so if the model does not provide the correct answer after the first pass, then by definition some confounders are ranked higher than the correct answer by the same frozen LM.

The development set scores of our textual LM recursion method for different numbers of sampled candidates after training for 10K steps on the Natural Questions training set (other training parameters are similar to prompt tuning parameters from the previous subsection). Evidently, while the recall increases with n, there are diminishing returns in terms of performance. n=16 was taken as the optimal number of sampled candidates, train a textual recursive LM with n=16 for 20× longer and early stop according to exact match on the dev set-which happens at 150$k$ steps with the value of 22.8. We compared its test set score to the saturated vanilla prompt tuning method and to the neural recursive LM, both trained for the same number of steps. Textual LM recursion underperforms relative to neural LM recursion by 3.2 points, but improves upon the saturated prompt tuning model that provided its input candidates by 3.5 points, despite both the candidate proposal and candidate choosing processes being based on the same frozen LM. We conjecture that this is because while the first LM pass provides the candidates at its final representation, in the second LM pass all candidates are considered and processed jointly with the question already from the input stage, which would increase the expressivity of the question answering process Levine et al. (2021).

For a better grasp of the differences between two LM recursion methods, the set of questions is focused on for which the saturated prompt tuning baseline was not able to provide the correct answer even when 64 answers were sampled from it. Given that the measured recall@64 is 44%, this set is roughly half of the Natural Questions development set. This subset was treated as questions that are beyond the scope of a single pass through our frozen J1-Large model and ask how well both LM recursion methods do on such questions. It can be shown that the textual recursive LM received an EM score of 3.8%, implying that it learned to be almost strictly extractive relative to the answers sampled during the first pass through the LM. Comparatively, the neural recursive LM receive an EM score of 12% on this "beyond the single-pass scope" question subset, implying that the neural processing invoked by the Connector network can lead to qualitatively stronger question answering abilities implemented by the LM-Connector-LM stack.

Overall, the methods presented in this section demonstrate that while LMs are treated as single-use resources per query, there is potential in treating them as resources that can be progressively revisited for improved performance per query. This is an economically disruptive premise relative to improving by replacing the single-use resource with a larger one; we leave a systematic development of these ideas to future work.

The systems and methods described above are presented in no particular order and can be performed in any order and combination. For example, various embodiments of the natural language system may include a combination of all of the features and functionality described above, or in some cases, the natural language system may offer any subset of described features and/or functionality.

The above-described systems and method can be executed by computer program instructions that may also be stored in a computer readable medium that can direct a computer, other programmable data processing apparatus, or other devices to function in a particular manner, such that the instructions stored in the computer readable medium produce instructions which when implemented cause the natural language system to perform the above-described methods.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the above-described methods.

It will be understood from the foregoing description that modifications and changes may be made in various embodiments of the present invention without departing from the invention described in this specification. The descriptions in this specification are for purposes of illustration only and are not to be construed in a limiting sense. The scope of the present invention is limited only by the language of the following claims.

What is claimed is:

1. A non-transitory computer-readable medium including instructions that when executed by one or more processing devices cause the one or more processing devices to perform a method including:

receiving a user input, wherein the user input includes a natural language question;

using at least one trained large language model to decompose the natural language question into one or more information requests;

identifying, using the at least one trained large language model, at least one information resource based on the one or more information requests;

formatting, using the at least one trained large language model, the one or more information requests for at least one input format associated with the at least one information resource;

routing each of the one or more information requests to the at least one information resource;

receiving one or more information responses from the at least one information resource, wherein the one or more information responses correspond to the one or more information requests;

generating a natural language response to the user input based on the one or more information responses; and providing the natural language response to the user.

2. The non-transitory computer-readable of claim 1, wherein the at least one trained large language model is static.

3. The non-transitory computer-readable of claim 1, wherein the natural language response is provided to the user via a display.

4. The non-transitory computer-readable of claim 1, wherein the at least one information resource includes a calculator application.

5. The non-transitory computer-readable of claim 1, wherein the at least one information resource includes a search engine.

6. The non-transitory computer-readable of claim 1, wherein the at least one information resource includes one or more of a news outlet, a Wiki page or a website available via an Internet connection.

7. The non-transitory computer-readable of claim 1, wherein the at least one information resource includes an expert module including a model trained to generate a specialized result based on an expected class of model input information.

8. The non-transitory computer-readable of claim 1, wherein the at least one information resource includes a database.

9. The non-transitory computer-readable of claim 1, wherein the one or more information requests relate to information generated after a time at which training of the at least one trained large language model was completed.

10. The non-transitory computer-readable of claim 1, wherein the one or more information requests relate to current events information.

11. The non-transitory computer-readable of claim 1, wherein the one or more information requests relate to dynamically changing information.

12. The non-transitory computer-readable of claim 11, wherein the dynamically changing information includes at least one of weather information, currency exchange rates, stock prices, or news.

13. The non-transitory computer-readable of claim 1, wherein the method performed by the one or more processing devices includes: outputting, to the user, indicators associated with both the one or more information requests decomposed from the natural language question and the one or more information responses received from the at least one information resource.

14. The non-transitory computer-readable of claim 1, wherein the method performed by the one or more processing devices includes: outputting, to the user, a log of tasks associated with generating the natural language response to the user.

15. The non-transitory computer-readable medium of claim 14, wherein the log of tasks comprises a list of operations including decomposing the natural language question into the one or more information requests, receiving the one or more information responses from the at least one information resource, and generating the natural language response.

16. The non-transitory computer-readable medium of claim 14, wherein the log of tasks includes an explanation of how the natural language response was generated.

17. The non-transitory computer-readable of claim 1, wherein the natural language question included in the user input includes a multi-part question, and wherein each of the one or more information requests is associated with a different part of the multi-part question.

18. The non-transitory computer-readable medium of claim 1, wherein the one or more information requests relate to dynamically changing information.

19. The non-transitory computer-readable medium of claim 1, wherein the at least one information resource includes a trained machine learning model.

20. The non-transitory computer-readable medium of claim 1, wherein using the at least one trained large language model to identify the at least one information resource includes analyzing the natural language question.

* * * * *